(12) United States Patent
Rogers

(10) Patent No.: US 8,321,802 B2
(45) Date of Patent: Nov. 27, 2012

(54) METHOD AND SYSTEM FOR CONTEXT DEPENDENT POP-UP MENUS

(75) Inventor: Sean S. Rogers, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 685 days.

(21) Appl. No.: 12/270,277

(22) Filed: Nov. 13, 2008

(65) Prior Publication Data

US 2010/0122194 A1 May 13, 2010

(51) Int. Cl.
*G06F 3/048* (2006.01)
(52) U.S. Cl. ........ 715/769; 715/808; 715/809; 715/810; 715/817; 715/818; 715/819; 715/820; 715/825; 715/828; 715/841; 715/845
(58) Field of Classification Search .................. 715/769, 715/808–810, 817–820, 825, 828, 841, 845
See application file for complete search history.

(56) References Cited

U.S. PATENT DOCUMENTS

| | | | | |
|---|---|---|---|---|
| 5,664,133 | A * | 9/1997 | Malamud et al. | 715/816 |
| 6,025,828 | A * | 2/2000 | Berry et al. | 715/835 |
| 6,061,060 | A * | 5/2000 | Berry et al. | 715/781 |
| 7,519,576 | B2 * | 4/2009 | Martinez et al. | 1/1 |
| 2002/0076109 | A1 | 6/2002 | Hertzfeld et al. | |
| 2002/0175955 | A1 | 11/2002 | Gourdol et al. | |
| 2003/0050773 | A1* | 3/2003 | Martinez et al. | 704/10 |
| 2004/0036713 | A1* | 2/2004 | Albaugh et al. | 345/709 |
| 2005/0246664 | A1* | 11/2005 | Michelman et al. | 715/856 |
| 2006/0242596 | A1* | 10/2006 | Armstrong | 715/786 |
| 2008/0172395 | A1* | 7/2008 | Lee et al. | 707/10 |
| 2009/0187842 | A1* | 7/2009 | Collins et al. | 715/769 |
| 2010/0017734 | A1* | 1/2010 | Cummins et al. | 715/769 |
| 2011/0087981 | A1* | 4/2011 | Jeong et al. | 715/765 |

FOREIGN PATENT DOCUMENTS

| | | |
|---|---|---|
| EP | 717343 A1 * | 6/1996 |
| EP | 1473624 | 11/2004 |
| WO | WO2006056243 | 6/2006 |
| WO | WO2007036762 | 4/2007 |
| WO | WO 2007036762 A1 * | 4/2007 |

OTHER PUBLICATIONS

International Preliminary Report on Patentability—PCT/US2009/061772, The International Bureau of WIPO—Geneva, Switzerland, Oct. 27, 2010.

* cited by examiner

*Primary Examiner* — Doon Chow
*Assistant Examiner* — Linh K Pham
(74) *Attorney, Agent, or Firm* — Nicholas A. Cole

(57) ABSTRACT

A method and system for providing context dependent pop-up menu icons that activate menu icons in response to a select & drag operation by manipulation of a pointing device. Presented icons may correspond to functions or actions that can be implemented with the particular type of content selected. Icons may be displayed in a consistent manner in terms of position and content with respect to the selected file or object. Icons may appear only during a select & drag operation, thereby leaving the display uncluttered at other times. Presentation of icons may be discontinued when the selected file or object is dragged beyond the area of the presented icons. New applications can register with the operating system to specify icons to be presented when corresponding files are selected or when particular content objects are selected within the application.

12 Claims, 20 Drawing Sheets

The quick brown fox jumped over the lazy dog's back.
The quick brown fox jumped over the lazy dog's back.
The quick brown fox jumped over the lazy dog's back.
The quick brown fox jumped over the lazy dog's back.
The quick brown fox jumped over the lazy dog's back.
The quick brown fox jumped over the lazy dog's back.
The quick brown fox jumped over the lazy dog's back.
The quick brown fox jumped over the lazy dog's back.
The quick brown fox jumped over the lazy dog's back.
The quick brown fox jumped over the lazy dog's back.
The quick brown fox jumped over the lazy dog's back.
The quick brown fox jumped over the lazy dog's back.
The quick brown fox jumped over the lazy dog's back.
The quick brown fox jumped over the lazy dog's back.

The quick brown fox jumped over the lazy dog's back.
The quick brown fox jumped over the lazy dog's back.
The quick brown fox jumped over the lazy dog's back.
The quick brown fox jumped over the lazy dog's back.
The quick brown fox jumped over the lazy dog's back.
Mr. B. Fox's phone number is 888-555-1212 and his residence at 123 Jump Street, Pittsburgh, PA 01234.
The quick brown fox jumped over the lazy dog's back.
The quick brown fox jumped over the lazy dog's back.
The quick brown fox jumped over the lazy dog's back.
The quick brown fox jumped over the lazy dog's back.
The quick brown fox jumped over the lazy dog's back.
The quick brown fox jumped over the lazy dog's back.
The quick brown fox jumped over the lazy dog's back.
The quick brown fox jumped over the lazy dog's back.

The quick brown fox jumped over the lazy dog's back.
The quick brown fox jumped over the lazy dog's back.
The quick brown fox jumped over the lazy dog's back.
The quick brown fox jumped over the lazy dog's back.
The quick brown fox jumped over the lazy dog's back.
Mr. B. Fox's phone number is 888-555-1212 and his residence is at 123 Jump Street, Pittsburgh, PA 01234.
The quick brown fox jumped over the lazy dog's back.
The quick brown fox jumped over the lazy dog's back.
The quick brown fox jumped over the lazy dog's back.
The quick brown fox jumped over the lazy dog's back.
The quick brown fox jumped over the lazy dog's back.
The quick brown fox jumped over the lazy dog's back.
The quick brown fox jumped over the lazy dog's back.
The quick brown fox jumped over the lazy dog's back.

| | 121 | 122 | 123 | 124 | 125 | 126 | 127 | 128 | 129 |
|---|---|---|---|---|---|---|---|---|---|
| Object or File | Copy | Cut | Open | Contact Add | Contact Look Up | Call | Send | Play | • • • |
| Text | 1 | 1 | 0 | 0 | 0 | 0 | 0 | 0 | |
| Name | 1 | 1 | 0 | 1 | 1 | 1 | 0 | 0 | |
| Phone # | 1 | 1 | 0 | 1 | 1 | 1 | 0 | 0 | |
| Email address | 1 | 1 | 0 | 1 | 1 | 0 | 1 | 0 | |
| URL | 1 | 1 | 1 | 1 | 1 | 0 | 0 | 0 | |
| Address | 1 | 1 | 0 | 1 | 1 | 0 | 0 | 0 | |
| Application | 0 | 0 | 1 | 0 | 0 | 0 | 0 | 0 | |
| Folder | 1 | 1 | 1 | 0 | 0 | 0 | 1 | 0 | |
| Text File | 1 | 1 | 1 | 0 | 0 | 0 | 1 | 0 | |
| MP3 File | 1 | 1 | 1 | 0 | 0 | 0 | 1 | 1 | |
| Image File | 1 | 1 | 1 | 0 | 0 | 0 | 1 | 0 | |
| Video File | 1 | 1 | 1 | 0 | 0 | 0 | 1 | 0 | |
| Application X | 0 | 0 | 1 | 0 | 0 | 0 | 0 | 1 | |
| App X type 1 | 1 | 1 | 0 | 1 | 0 | 0 | 1 | 0 | |

METHOD AND SYSTEM FOR CONTEXT DEPENDENT POP-UP MENUS

FIELD

The present invention relates generally to computer user interface systems and more particularly to methods and systems for providing context-dependent drag and drop menus within a graphical user interface.

BRIEF DESCRIPTION OF RELATED ART

Modern personal computers and electronic mobile devices typically implement a graphical user interface (GUI) to enable communicating commands to the device. Current typical GUI systems enable users to select objects and initiate actions using a pointer device by positioning a cursor over a portion of the display and selecting an item by pressing a button. Such GUI systems allow users to select applications, file folders, and files in a menu display (e.g., "desktop" display), and individual words, phrases, graphics, selections of music, selections of graphics, etc. within a document or application. In Windows® type GUI systems, a user can take an action on an object or selection by "highlighting" the item, such as by positioning the pointing device over the item and clicking on mouse button (for example), and then entering a command on a keyboard. Highlighted objects or selections can also be "dragged" by moving the pointing device while holding down the selection button and "dropped" by releasing the selection button to move the object or selection to another location in the document or display.

In typical GUI systems, users may also implement action on selected files or objects by clicking on a button (e.g., a right mouse button) to bring up a menu of options suitable for the selected object or selection (e.g., copy, cut, paste, open, run, etc.) that can then be selected by positioning the cursor with the pointing device and clicking a button. In some applications and in some GUI systems (e.g., the Leopard® operating system by Apple Computer, Inc.) a user can initiate an action (e.g., copy, cut, paste, open, run, etc.) by "dragging & dropping" a selected file, application or object onto a suitable icon displayed on the screen (i.e., an icon associated with a particular operation, such as a trashcan icon which is associated with a delete function). For example, to designate a file for deletion in such a GUI system a user may select the file with a mouse (i.e., by "clicking on" the file icon), drag it over a trashcan icon, and "drop" the file onto the icon by releasing the mouse button.

SUMMARY OF THE INVENTION

In one aspect, a method for providing menu icons in a graphical user interface (GUI) is presented. The method may include detecting a select and drag event of the object, determining a type of the selected object, identifying actions or functions that are appropriate for the type of the selected object and displaying one or more pop-up menu icons associated with the identified actions or functions appropriate for the selected object. The method may further include positioning the pop-up menu icons in a predefined location on a GUI display, positioning the pop-up menu icons in close proximity to the selected object within a GUI display, performing an action or function on the selected object in response to the selected object being released when positioned over one of the pop-up menu icons corresponding to the action or function, or terminating display of the one or more pop-up menu icons in response to the selected object being dragged beyond an area associated with the one or more pop-up menu icons. The object may include at least one of an application, file, file folder, text selection within a document, image selection within a document, portion of a an audio file and portion of a video file. The method may further include registering an application with the GUI including identifying one or more pop-up menu icons which should be displayed when an icon associated with the application is selected and dragged within the GUI.

In another aspect, a computer is presented including a processor, a display coupled to the processor, and a memory coupled to the processor. The processor of the computer may be configured to detect a select and drag event of the object, determine a type of the selected object, identify actions or functions that are appropriate for the type of the selected object, and display on the display one or more pop-up menu icons associated with the identified actions or functions appropriate for the selected object. The processor may also be configured to position the pop-up menu icons in a predefined location on the GUI display, position the pop-up menu icons in close proximity to the selected object within the GUI display, perform an action or function on the selected object in response to the selected object being released when positioned over one of the pop-up menu icons corresponding to the action or function, terminate display of the one or more pop-up menu icons in response to the selected object being dragged beyond an area associated with the one or more pop-up menu icons, or register an application with the GUI including identifying one or more pop-up menu icons which should be displayed when an icon associated with the application is selected and dragged within the GUI. The object may include at least one of an application, a file, file folder, text selection within a document, image selection within a document, portion of a an audio file and portion of a video file.

In another aspect, a computer is presented including a means for detecting a select and drag event of the object, a means for determining a type of the selected object, a means for identifying actions or functions that are appropriate for the type of the selected object, and a means for displaying on the display one or more pop-up menu icons associated with the identified actions or functions appropriate for the selected object. The computer may include a means for positioning the pop-up menu icons in a predefined location on the GUI display, a means for positioning the pop-up menu icons in close proximity to the selected object within the GUI display, a means for performing an action or function on the selected object in response to the selected object being released when positioned over one of the pop-up menu icons corresponding to the action or function, a means for terminating display of the one or more pop-up menu icons in response to the selected object being dragged beyond an area associated with the one or more pop-up menu icons, or a means for registering an application with the GUI including identifying one or more pop-up menu icons which should be displayed when an icon associated with the application is selected and dragged within the GUI. The object may include at least one of an application, a file, file folder, text selection within a document, image selection within a document, portion of a an audio file and portion of a video file.

In another aspect, a computer program product is presented, in which the computer program product has a computer readable medium that may include an instruction to detect a select and drag event of the object, an instruction to determine a type of the selected object, an instruction to identify actions or functions that are appropriate for the type of the selected object and an instruction to display one or more pop-up menu icons associated with the identified actions or functions appropriate for the selected object. The computer-readable medium may further include an instruction to position the pop-up menu icons in a predefined location on a GUI display, an instruction to position the pop-up menu icons in close proximity to the selected object within a GUI display, an instruction to perform an action or function on the selected object in response to the selected object being released when positioned over one of the pop-up menu icons corresponding to the action or function, an instruction to terminate display of the one or more pop-up menu icons in response to the selected object being dragged beyond an area associated with the one or more pop-up menu icons, or an instruction to register an application with the GUI including identifying one or more pop-up menu icons which should be displayed when an icon associated with the application is selected and dragged within the GUI. The computer-readable medium may cause a processor of a computer to perform steps such that the object may include at least one of an application, file, file folder, electronic document, text selection within a document, image selection within a document, portion of an audio file and portion of a video file.

Additional aspects will be apparent in the foregoing description and equivalents thereof.

BRIEF DESCRIPTION OF THE DRAWINGS

The accompanying drawings, which are incorporated herein and constitute part of this specification, illustrate exemplary aspects of the invention. Together with the general description given above and the detailed description given below, the drawings serve to explain features of the invention. In the figures, like reference numerals refer to like parts throughout the various views unless otherwise indicated.

FIGS. 4-27 are illustrations of graphical user interface displays showing example displays of context-dependent pop-up menus in response to various select and drag operations according to various aspects;

FIG. 29 is an example data table suitable for defining context-dependent pop-up menus for various applications, file types and objects according to an aspect;

DETAILED DESCRIPTION

Figure 1:
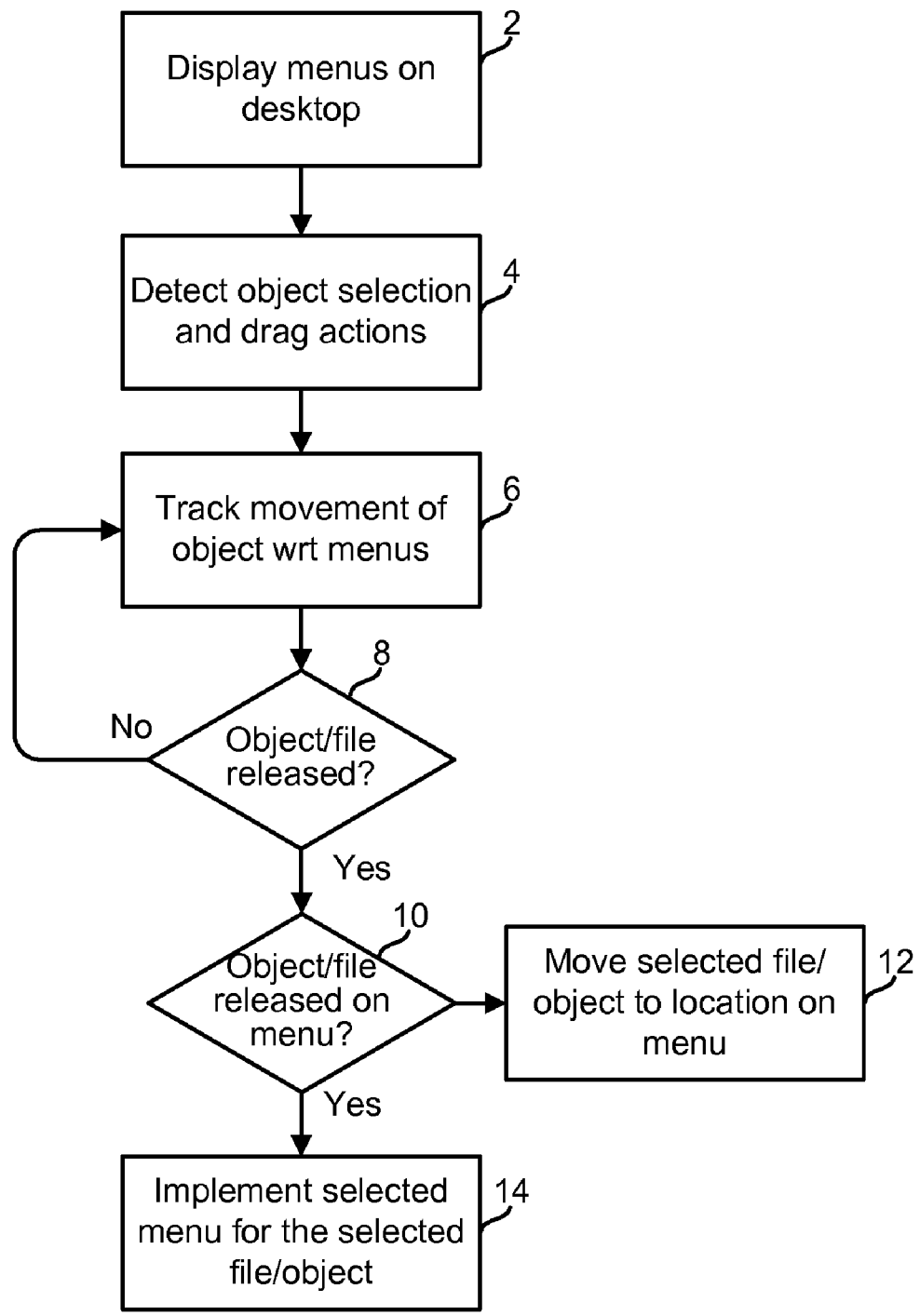
FIG. 1 is a process flow diagram of a prior art drag & drop GUI interface function.

Various aspects will be described in detail with reference to the accompanying drawings. References made to particular examples and implementations are for illustrative purposes and are not intended to limit the scope of the invention or the claims.

As used herein, the terms "computer," "computing device" or "mobile device" refer to any one or all of personal computers, notebook computers, cellular telephones, personal data assistants (PDA's), palm-top computers, wireless electronic mail receivers and cellular telephone receivers (e.g., the Blackberry® and Treo® devices), multimedia Internet-enabled cellular telephones (e.g., the iPhone®), and similar personal electronic devices which include a programmable processor, memory and a connected or integral display configured with a graphical user interface (GUI). In a preferred aspect, the electronic device is a cellular telephone with a display configured with a graphical user interface.

As used herein, a "touchscreen" is a touch input device including a display which can detect the presence and location of a touch within the display and accept such direct onscreen input. As used herein, a "touchpad" is a touch input device including a specialized surface that can translate the motion and position of a user's fingers or a stylus to a relative position on screen. A touchpad, for example, can be implemented on any surface of an electronic device outside the image display area. Touchscreens and touchpads may be integral parts of an electronic device, such as a touchscreen display, or a separate module which can be coupled to the electronic device by a wired or wireless data link, such as an electronic pen and tablet.

As used herein, a "pointing device" refers to any human-computer interface device capable of receiving physical inputs from a user that can be translated into locations and actions in a GUI. Common pointing devices include a mouse, touchscreen display, touchpad (as typically employed on some notebook computers), joystick, pointing stick, multi-direction rocker switch (as typically employed on some cellular telephones), trackball mouse, and electronic pen and tablet. Future pointing devices that may be developed and would be encompassed in the various aspects also include large touch sensitive display panels, eye trackers, and electronic gloves. Pointing devices are typically integrated with GUI software to position and control a cursor which appears on the display and moves in conjunction with inputs to the pointing device.

For simplicity of description, the functionality that enables users to take action upon a file or object by selecting it, dragging it across the display and dropping it on menu icon corresponding to an action or function is referred to as "drag & drop GUI functionality." While the usefulness of GUI interfaces is well known, drag & drop GUI functionality has also been shown to be very useful in certain devices and implementation, such as in applications where pointing devices do not have multiple buttons or do not have any buttons at all (e.g., touchscreen displays). The ability to take an action on a selected item merely by dragging it to an icon and releasing it permits users to perform complex tasks without having to touch a keyboard or entering commands. In computers and mobile devices which have few buttons and rely upon a touchscreen interface (e.g., table PC's and touchscreen mobile devices), the drag & drop GUI gives users a powerful and intuitive interface for accessing and manipulating files and objects with one hand.

Nevertheless, the drag & drop GUI functionality suffers from the limitation that the menu icons must appear on the screen along with other items in the menu display or the document itself. As a result, valuable display "real estate" is taken up by the icons associated with file and object manipulation actions. This requirement may limit the usefulness of the drag & drop GUI in computing devices with small displays, which may be in mobile devices like cellular telephones. In such implementations, the screen is so small that including all file/object manipulation icons within the display will leave little room for files or documents. In computers with larger displays, the drag & drop GUI requires the user to move the item to wherever the appropriate icon is located; in a large display, this may require dragging an item across the entire screen.

The various aspects provide a context-dependent pop-up menu icon within a GUI system that is activated (i.e., displayed or caused to "pop-up" within the display) by a 'select & drag' operation to display action menus or destinations for the selected file or object. When a user selects a particular file or content object (e.g., a word, phrase, or selection of an image) within a document and begins to drag the selection across the display using a pointing device, a set of one or more menu icons is presented (i.e., pop-up) corresponding to action or function options that the user may implement for the selection. The presented menu icons may correspond to specific functions or actions that are available and can be applied to the particular type of file, object or content that has been selected and dragged. Such pop-up menu icons may be generated for practically anything that can be selected and dragged by a user, who is manipulating a pointing device within a GUI, including for example application icons, file icons, and file folder icons within a GUI display, as well as text selections, numeric selections, portions of a spread sheet, graphics, portions of graphics, images, portions of images, audio files, portions of audio files, video files, and portions of video files within an electronic document. For ease of reference, a selection by a pointing device, be it an application, file, folder or a selection within a document, is referred to herein as an "object." Thus, the word "object" herein is intended to refer to something selected by manipulation of a pointing device within a GUI system, and should not be interpreted to be limited to programming object in an object-oriented programming environment.

The pop-up menu icons may be displayed in fixed positions on the display or in close proximity to the selection in a consistent manner in terms of position and content. Thus, particular menu icons may consistently appear in the same relative position on the display (e.g., a particular corner of the display) or same relative position with respect to the selection (e.g., to the left or right and above or below the selection). To avoid cluttering the display, menu icons may appear only during a select & drag operation. Thus, a full set of function icons may be provided for drag & drop GUI functionality without cluttering the display with icons that are used only infrequently. While menu icons may appear only during a select & drag operation, the presented menu icons may be removed when the user drags the selected file or object beyond the area of the presented icons. Thus, if a user is merely dragging a word or phrase to a new location in a document, the drag & drop GUI menu icons will quickly disappear as the drag operation proceeds beyond the icons. In an aspect, new applications can register with the operating system in order to specify icons to be presented when the files of the corresponding file type are selected in a menu or when specified content is selected within the application. In this manner, platform-consistent, context-dependent pop-up menu icons can be provided for all applications and content.

The functioning and benefits of the various aspects may be understood in contrast to currently known drag & drop GUI functionality, which is illustrated in the process flow diagram shown in FIG. 1. To implement a process on an object using currently known drag & drop GUI functionality, icons corresponding to various actions are presented on the GUI display, block 2. For example, a typical drag & drop capable GUI includes a trashcan icon associated with the function of designating a file for deletion. The GUI is configured to detect when a particular file or object is selected by a pointing device, block 4, such as by detecting when a mouse button is pressed and determining the icon corresponding to the current cursor location on the display. The GUI may then track the movement of the selected object with respect to the function icons presented on the display, block 6. Movement tracking of the selected object, block 6, may continue until the object or file is released by the user releasing the mouse button. For example, the GUI may continually decision block whether the mouse button has been released, decision block 8, and continue to track the movement if it has not been released. Once the object or file is released (i.e., decision block 8="Yes"), the GUI may compare the location of the cursor at the time of release to the positions of the various menu icons to determine if the object or file was "dropped" onto one of the icons, decision block 10. If the cursor location does not correspond to an icon location, then the GUI may simply reposition the selected file or object icon on the display, block 12. If the cursor location does correspond to an icon location (i.e., decision block 10="Yes"), the GUI system may determine the functionality associated with that particular icon location and then implement that functionality on the selected file or object, block 14. If the functionality associated with the particular icon location is not available to the selected file or object, then no actions are taken. Thus, in previously known drag & drop GUI systems, the available menu icons were presented at all times on the display.

Figure 2:
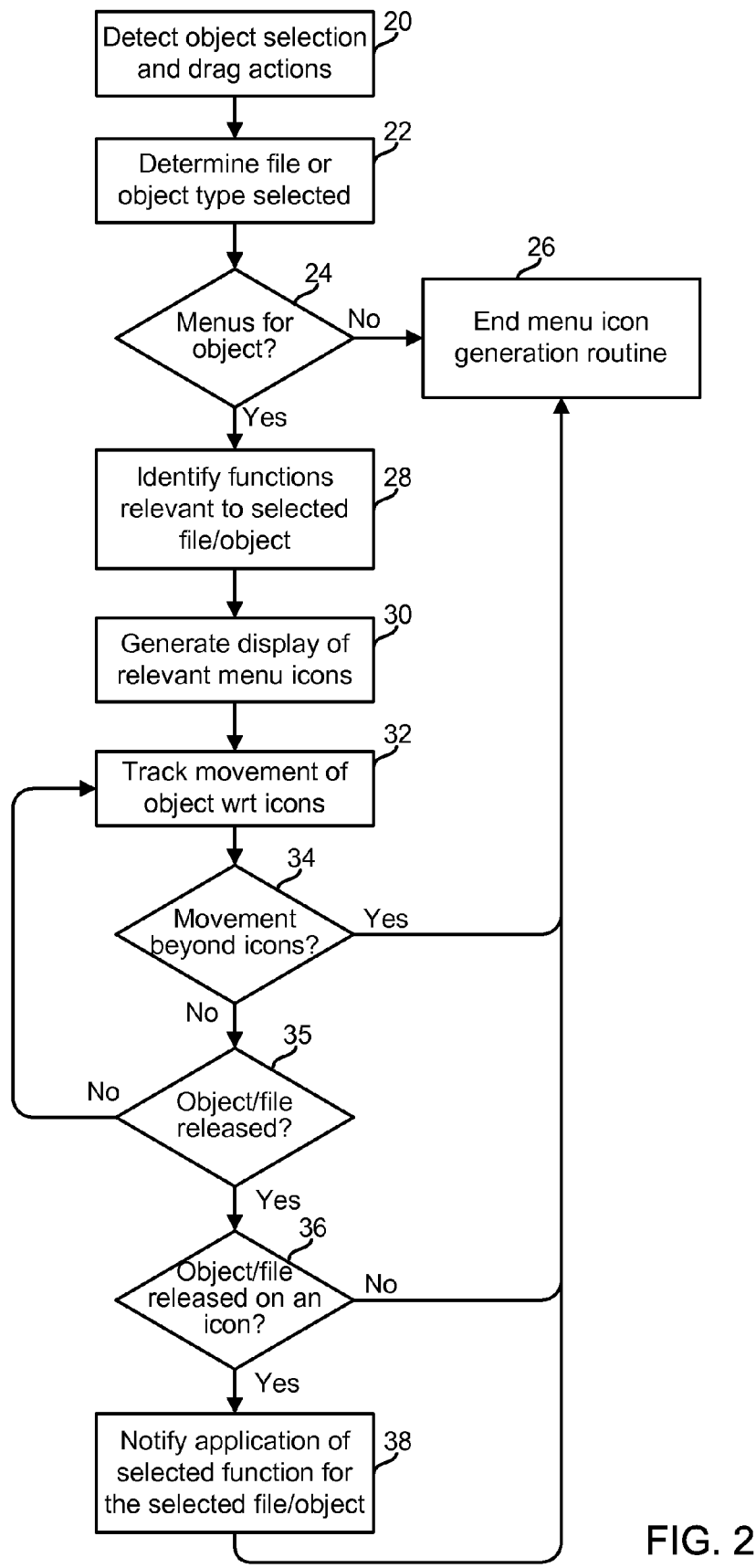
FIG. 2 is a process flow diagram of context-dependent pop-up menu functionality according to an aspect.

In contrast to the prior art, FIG. 2 is a process flow diagram of an aspect that presents menu icons only during a select & drag operation. This process flow may be implemented as part of a GUI system, such as a subroutine that provides a part of the GUI functionality. In this aspect, the GUI will detect when a user clicks on a file or content object and begins to drag the selection across the display by manipulating a pointing device, block 20. Detection of file or content objects selections and manipulations from pointing device inputs may employ any methods well-known in other GUI systems. When a select & drag operation is detected, the GUI system determines the type of file or content object that has been selected, block 22. This block may involve examining a file type extension of a selected file or examination of the particular content object selected, such as using methods described below with reference to FIG. 3. Having determined the type of file or object selected, the GUI system may determine whether there are any actions or functions available or suitable for the selection, decision block 24. If there are no actions or functions that can be implemented on the selection (i.e., decision block 24="No"), no pop-up menu icons will be generated and the pop-up icon generation routine may be ended, block 26, with processing continuing according to the rest of the GUI functionality. If an action or function can be implemented on the selected file or object (i.e., decision block 24="Yes"), the GUI system may identify the particular actions or functions icons that are relevant to the selection, block 28. As described in more detail below, this process may be implemented in software as a series of conditional operations as described with reference to FIG. 3, or as a lookup process in conjunction with a lookup data table as described with reference to FIG. 29. Once the actions or functions relevant to the selection had been identified, the GUI system may generate and present a display of those menu icons corresponding to those relevant actions or functions, block 30. In one aspect, the generated menu icons are presented in a particular location on the display, such as in the four corners and/or other locations about the display periphery. In another aspect, the generated menu icons are presented in close proximity to the initial location of the selection, with their relative position depending upon the type of menu icon and the position of the cursor on the display.

With the pop-up menu icons presented on the display, the GUI system may track the movement or position of the selection as it is dragged across the display with respect to the icons, block 32. The generated menu icons do not move once they appear on the display, so the movement of the selection can be tracked with respect to those icons. As the selection movement is tracked, the GUI system may frequently determine whether the selection has been dragged beyond the area of the menu icons (particularly in the aspects which present the icons in close proximity to the selection), decision block 34. If the selection has been dragged beyond the area of the menu icons (i.e. decision block 34="Yes"), the menu icons may be deleted from the display and the pop-up menu icon routine terminated, block 26, with processing continuing according to the rest of the GUI functionality.

If the selection has not been dragged beyond the area of the menu icons (i.e., decision block 34="No"), the GUI system may determine whether the selection has been released (e.g., the mouse button has been released), decision block 35. If the selection has not been released (i.e., decision block 35="No"), the GUI system may continue to track movement of the selection, block 32. Once the selection is released (i.e., decision block 35="Yes"), the GUI may compare the location of the cursor at the time of release to the positions of the various menu icons to determine if the object or file was "dropped" onto one of the pop-up menu icons, decision block 36. If the cursor location does not correspond to an icon location (i.e., decision block 36="No"), the menu icons may be deleted from the display and the pop-up menu icon routine terminated, block 26, with processing continuing according to the rest of the GUI functionality, such as repositioning the selected file or object icon on the display. If the cursor location does correspond to a particular pop-up menu icon location (i.e., decision block 36="Yes"), the GUI system may perform the action or function corresponding to that menu icon (if there is no application function), or notify an application of the action or function corresponding to that menu icon so that the appropriate action or function can be implemented on the selection, block 38. Once the action or function corresponding to the particular menu icon is implemented, the menu icons may be deleted from the display and the pop-up menu icon routine terminated, block 26, with processing continuing according to the rest of the GUI functionality.

Figure 3:
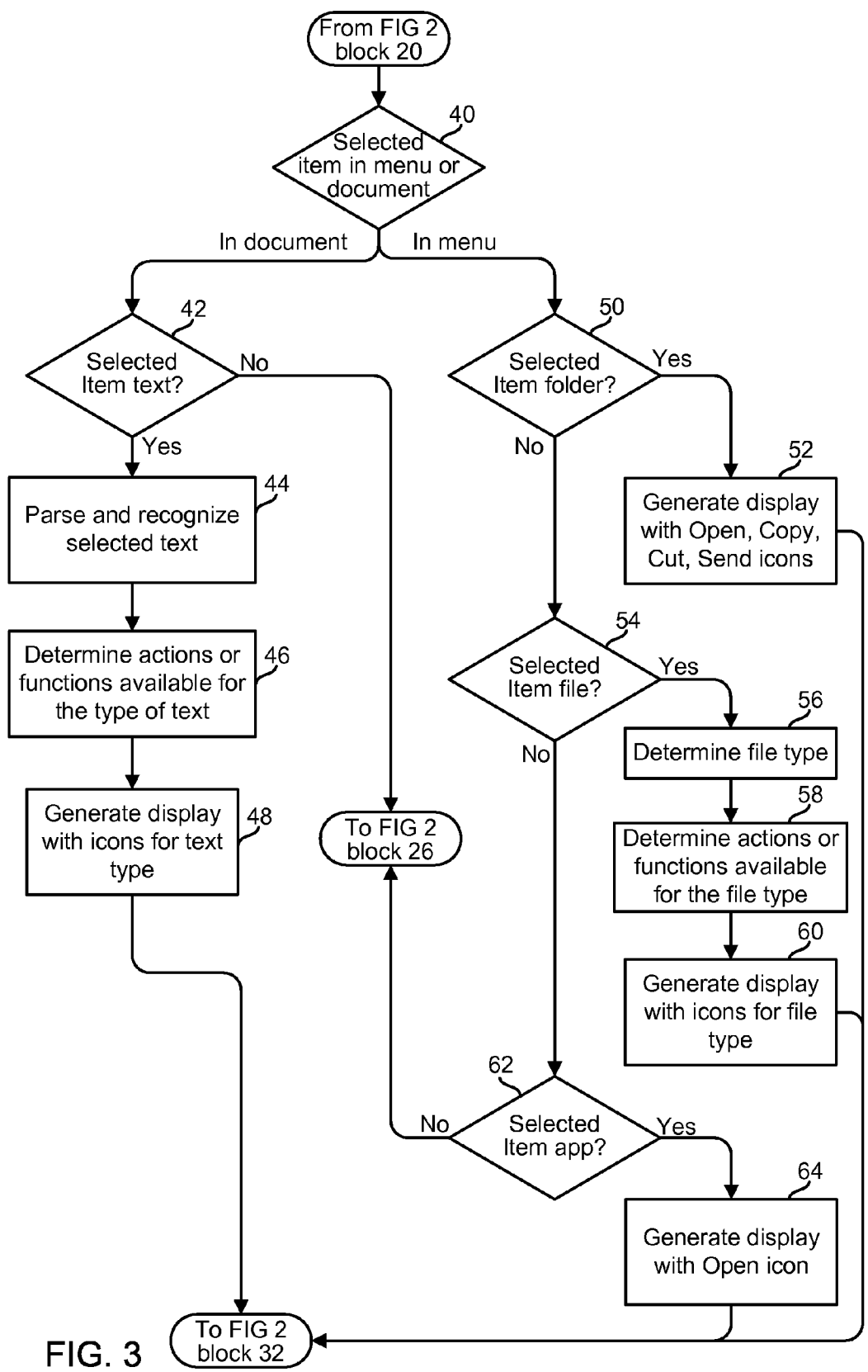
FIG. 3 is a process flow diagram of example steps that may be implemented to generate content-specific pop-up menus.

A variety of methods may be implemented to determine the type of file or object selected and which pop-up menu icons should be presented in the display. FIG. 3 illustrates example process blocks that may be implemented to accomplish this according to an aspect. In the aspect illustrated in FIG. 3, determination of the selection and identification of suitable pop-up menu icons is accomplished using conditional logic. This aspect is presented by way of example, and is not intended to limit the scope of the invention because a number of other processing routines may be implemented to accomplish the functionality associated with blocks 22 through 30 described above with reference to FIG. 2.

Referring to FIG. 3, the GUI system may determine whether the selection was made within a menu context (e.g., within a desktop or file list) or within an application or document, decision block 40. If the selection was made within a document, as may be the case when a word or phrase has been selected within a word processing application, the GUI system may determine whether the selection includes text, decision block 42. If the selection includes text (i.e., decision block 42="Yes"), the selection may be parsed to determine the type or content of the text, block 44. For example, the selection may be parsed and compared to templates to recognize names, telephone numbers, e-mail addresses, Internet addresses (e.g., a URL), mailing addresses, currency or other numeric values, etc. If the selection does not match a predefined type, then it may be assumed to be ordinary text. Any of a variety of known methods for parsing and recognizing text content may be implemented in this block 44.

After determining the type of text contained within the selection, the GUI system may determine the actions or functions that are appropriate for or available to act on the determined text type, block 46. For example, if the selected text includes a name, the name may be copied, cut, added to a contacts database or used to look up a contact in the contacts database, for example. Also, other functions may be available and appropriate for a name, such as conducting an Internet search (e.g., conducting a Google search on the name). The available actions or functions may be determined using conditional logic, such as in a series of "if [type], then [actions list]" software instructions. Alternatively, a table-look up algorithm may be implemented as described below with reference to FIG. 29. Once the available and appropriate actions or functions are identified for the selected text, the GUI may generate a display of the corresponding pop-up menu icons, block 48. Once the display is generated, the processing may proceed to track movements of the selection as described above with respect to block 32 in FIG. 2.

For purposes of this example, if the selection is not text (i.e., decision block 42="No"), there are no actions or functions available to act on the selection, so no menu icons may be displayed and the pop-up menu icon routine terminated, FIG. 2 block 26, with processing continuing according to the rest of the GUI functionality. In a typical implementation, functions or actions may be available for image selections (e.g., selections from PDF, TIF or JPG images), such as copy, cut, save, etc., so additional determinations may be applied to the document selection to identify such document types and generate appropriate pop-up menu icons.

Returning to decision block 40, if the item was selected in a menu or desktop setting, the item will be a file, a folder or an application. In that case, the selection may be further examined by the GUI system to determine if it is a file folder, decision block 50. If the selection is a file folder (i.e., decision block 50="Yes"), then appropriate actions or functions include open, copy, cut (or delete) and send (e.g., as an attachment to an e-mail). Accordingly, the GUI system may generate a display of pop-up menu icons for open, copy, cut (or delete) and send, block 52. If the selection is not a file folder (i.e., decision block 50="No"), the GUI system may determine if the selection is a file (e.g., a text, image, audio, video, PDF, or other type that can opened or acted upon by an application), decision block 54.

If the selection is a file, the GUI system may further examine the selection to determine the file type, block 56. For example, the GUI system may examine a file extension to determine the file type (e.g., by matching the extension to a table of extensions). Using the determined file type, the GUI system can then determine the actions or functions appropriate and available for the file type. For example, if the file is a text file, it may be copied, cut (or deleted), sent, or opened by a text editor. Also, other functions may be available for a text file, such as spell checking. As another example, if the file is an MP3 file, it may be copied, cut (or deleted), sent or played. Having determined the actions or functions available and appropriate for the file type, the GUI system can generate a display of pop-up menu icons corresponding to those actions or functions, block 60.

If the selection is not a file (i.e., decision block 54="No"), the GUI system may examine the selection further to determine if it is an executable application, decision block 62. If selection is an executable application (i.e., decision block 62="Yes"), the available actions or functions may be limited to open, in which case the GUI system can generate a display of a pop-up menu icon corresponding to the open actions, block 64. If the selection is not an executable file (i.e., decision block 62="No"), no action or function may be available, so no menu icons may be displayed and the pop-up menu icon routine terminated, FIG. 2 block 26, with processing continuing according to the rest of the GUI functionality. If pop-up menu icons are displayed (as may occur if any one of decision blocks 50, 54, 62="Yes"), processing may proceed to track movements of the selection as described above with respect to block 32 in FIG. 2.

The functioning and functionality of the various methods may be further understood by reference to examples illustrated in FIGS. 4-27. Each of these figures illustrate a display 70 of a computer or mobile device, with the displays illustrating various blocks in the implementation of various aspects as might be viewed by a user. In these examples the large arrow 71 represents the cursor of the GUI interface.

In the example illustrated in FIG. 4, the display 70 shows a portion of a text document in which the user has used a pointing device to select a word 72, namely "jumped." FIG. 4 illustrates how the display 70 will appear before pop-up menu icons are displayed, showing how the display 70 is not cluttered with menu icons.

FIG. 5 illustrates the example shown in FIG. 4 after the user has dragged the selected word 72 which triggers pop-up menu icons 74, 76, 78 and 80 to be displayed. In this example the word 72 "jumped" is a simple text item, so the actions or functions available for text are, in this example, copy 74, cut 76, spell check 78 and look up in Google® 80. Also, this example shows the aspect in which the pop-up menu icons are presented in standard locations in the display 70, namely the four corners of the display 70 in this example.

Figure 6:
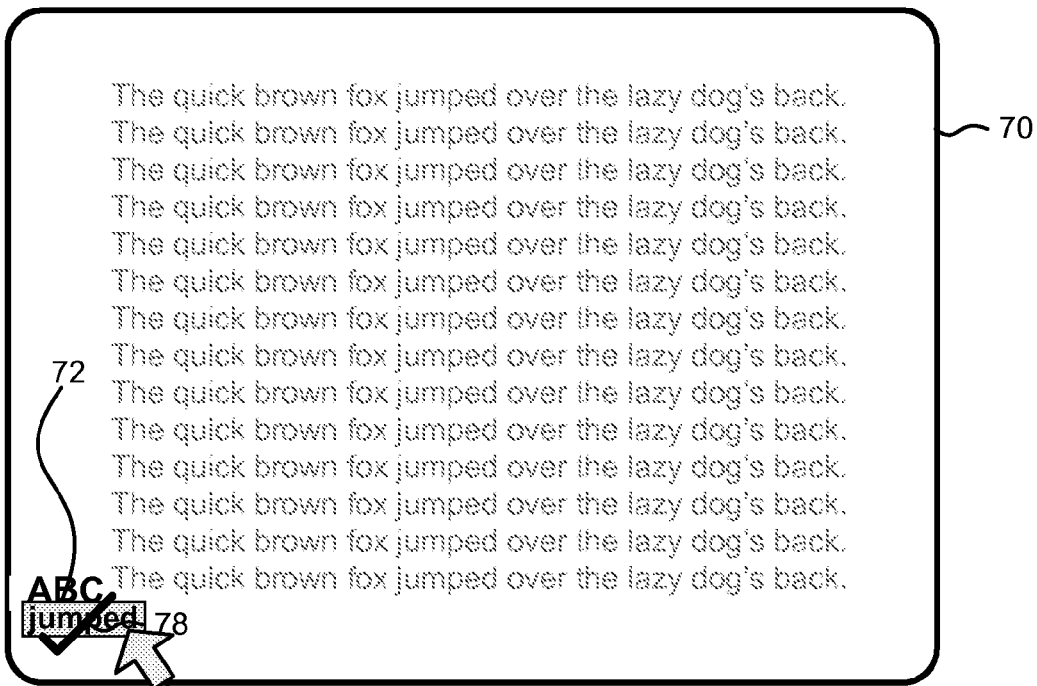

FIG. 6 illustrates how the display 70 will occur if the user drags the selected word 72 and releases ("drops") it on the spell checking function icon 78. This action causes the other pop up menu icons 74, 76, 80 to disappear as shown, and the spell checking function to be performed on the selected word.

Figure 7:
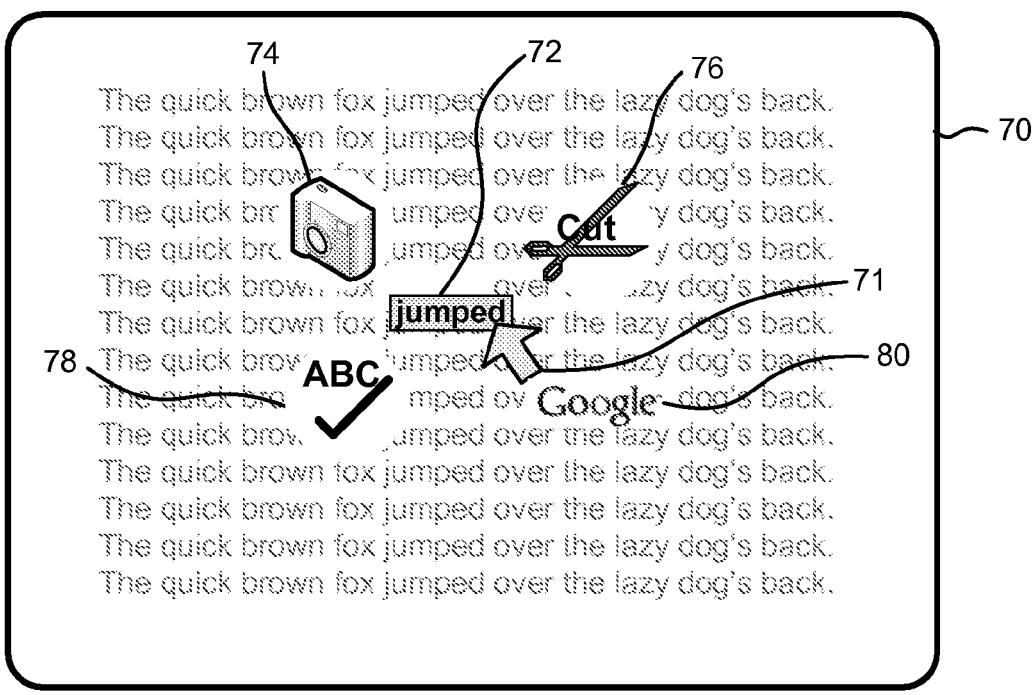

FIG. 7 illustrates the aspect in which the pop-up menu icons are presented in close proximity to the selection after the user has dragged the selected word 72 to trigger display 70 of the pop-up menu icons 74, 76, 78 and 80. As in FIG. 5, in this example the word 72 "jumped" is a simple text item, so the actions or functions available for text are copy 74, cut 76, spell check 78 and look up in Google® 80. As FIG. 7 illustrates, the pop-up menu icons appear close by the selection so a user can select an action or function by dragging the selection a short distance. While the pop-up menu icons 74, 76, 78 and 80 appear over the document on the display 70, the icons will appear only until a selection is made, and therefore do not block the display 70 except when the menu icons are relevant.

Figures 8, 9:
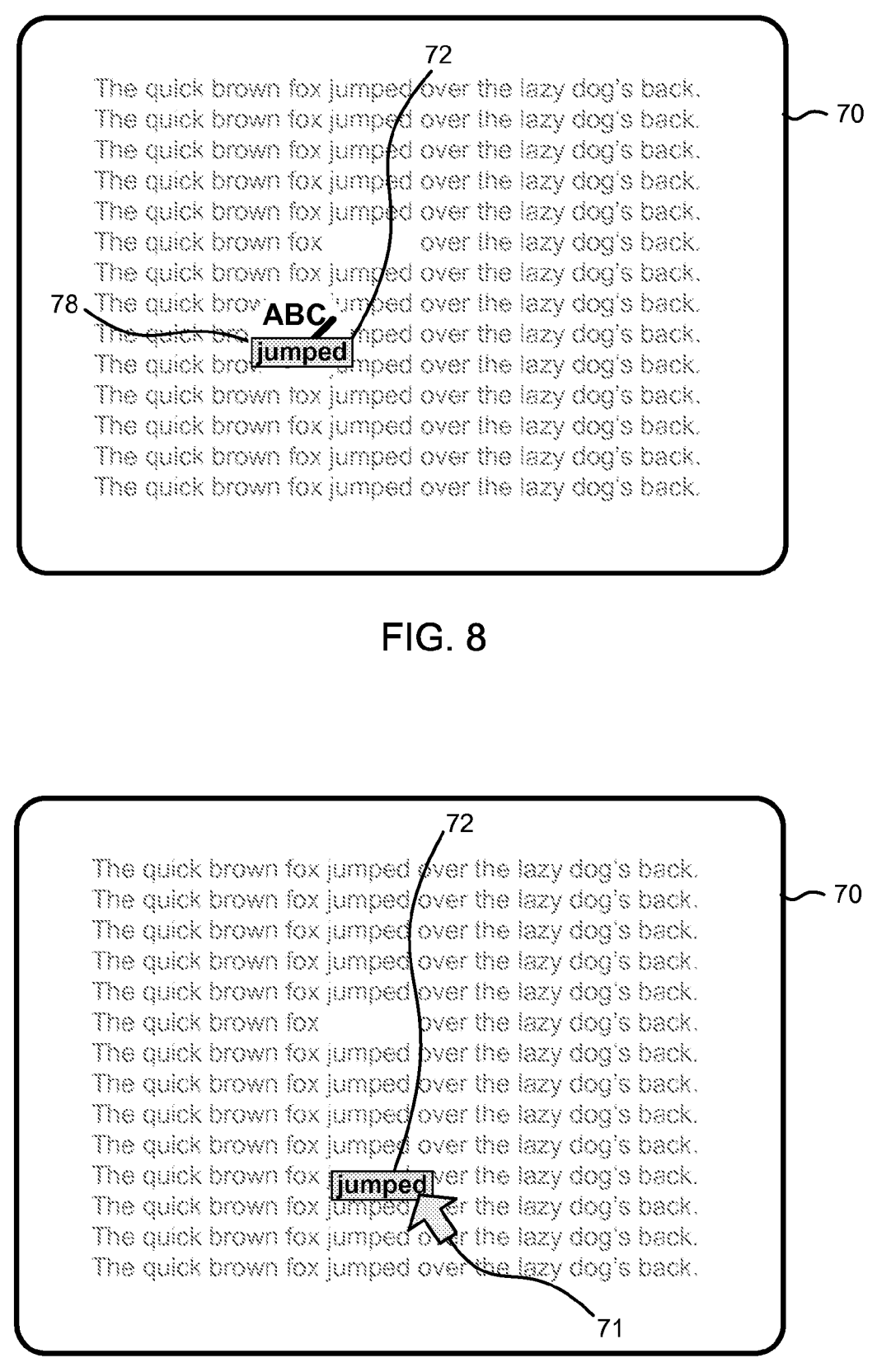

FIG. 8 illustrates how the display 70 will occur if the user drags the selected word 72 and releases ("drops") it on the spell checking function icon 78. This action causes the other pop-up menu icons 74, 76, 80 to disappear as shown, and the spell checking function to be performed on the selected word.

FIG. 9 illustrates how the display 70 will occur if the user drags the selected word 72 beyond the area of the pop-up menu icons shown in FIG. 7. This action by the user causes the pop-up menu icons to be deleted and the GUI system to be returned to normal functioning (see decision block 34 and block 26 in FIG. 2). As FIG. 9 shows, this functionality allows a user to cause the pop-up menu icons to go away simply by moving the selection a certain distance, after which the selection can repositioned and dropped without inadvertently activating an undesired menu. Thus, the pop-up menu icons do not prevent users from utilizing drag & drop processes available in conventional GUI systems.

FIG. 10 illustrates an example of the display 70 in which a user has selected a name 82 but has not yet dragged the selection. FIG. 11 illustrates the display 70 after the user has dragged the name 82 a small distance triggering display of the pop-up menu icons 74, 76, 80, 84, 86, 88. In this example, the GUI system recognizes that the selected text is a name and accordingly displays pop-up icons that are suitable for a name, including copy 74, cut 76, add to a contacts database 84, look up in the contacts database 86, call 88 and, in this example, look up in Google® 80. FIG. 11 also illustrates how the copy 74, cut 76 and Google® 80 menu icons are positioned in approximately the same position relative to the selection as shown in the example in FIG. 7. Thus, since copy 74 and cut 76 are available for both text and name objects, these menu icons appear in the same relative position. Thus, a user will learn that these functions can be accomplished on a selection by moving the selection in the same directions even though the selections include different types of content. FIG. 11 also illustrates how the placement of the pop-up menu icons may be adjusted to fit within the display 70 when the selection appears near a display boundary.

FIG. 12 illustrates an example of the display 70 in which a user has selected a telephone number 90 but has not yet dragged the selection. FIG. 13 illustrates the display 70 after the user has dragged the telephone number 90 a small distance triggering display of the pop-up menu icons 74, 76, 84, 86, 88. In this example, the GUI system recognizes that the selected text is a telephone number and accordingly displays pop-up icons that are suitable for a telephone number, including copy 74, cut 76, add to a contacts database 84, look up in the contacts database 86, and call 88.

Figure 14:
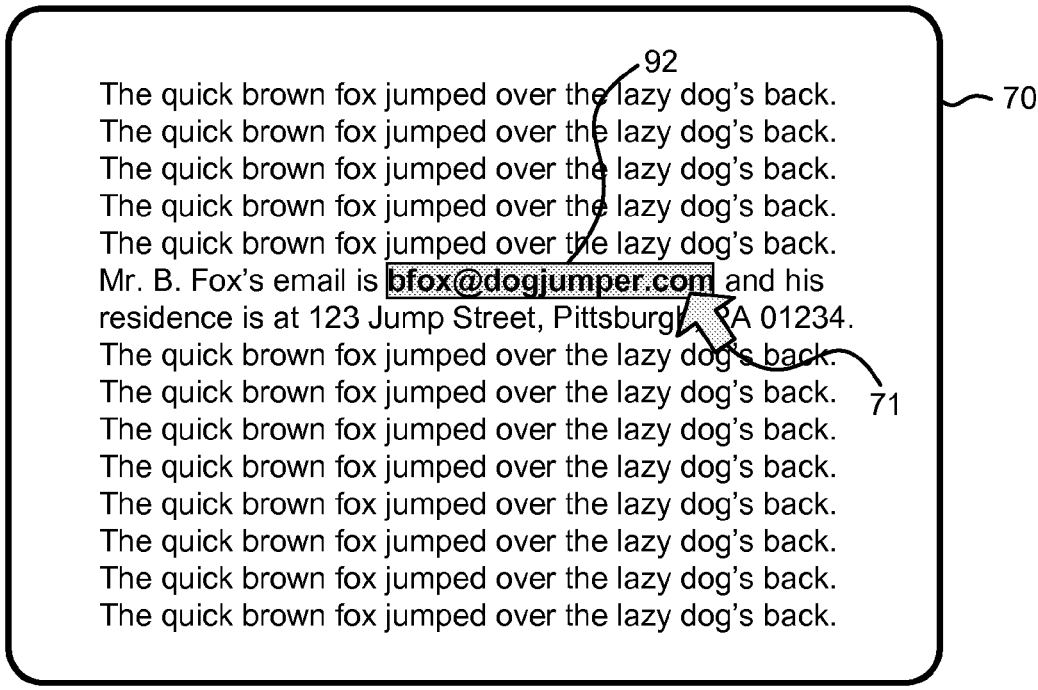
Figure 15:
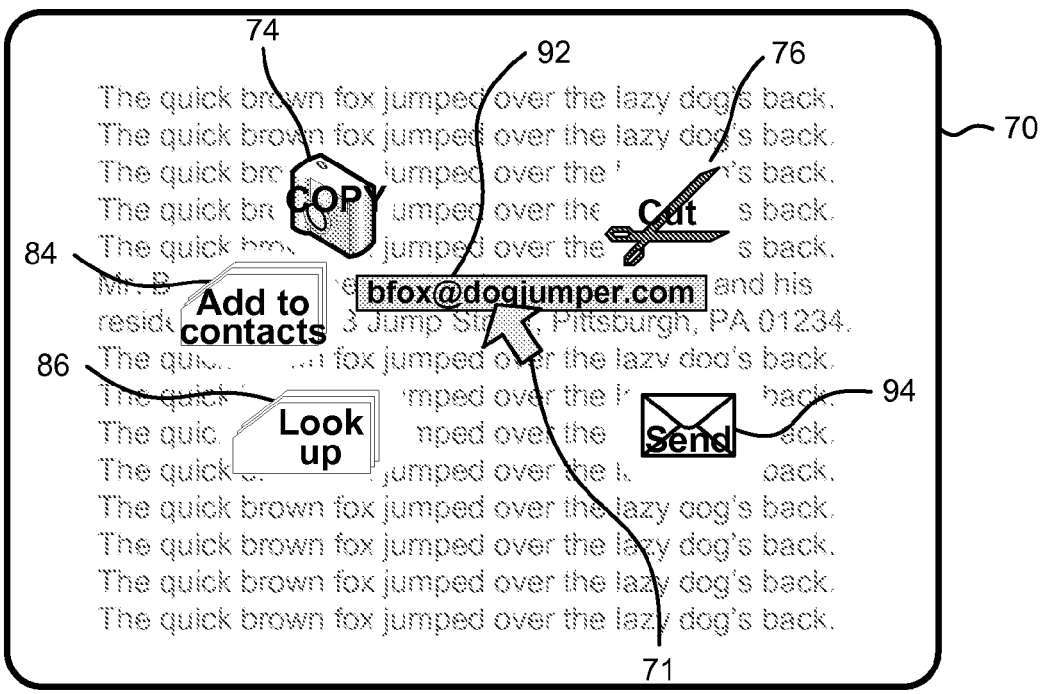

As a further example, FIG. 14 illustrates an example of the display 70 in which a user has selected an e-mail address 92 but has not yet dragged the selection. FIG. 15 illustrates the display 70 after the user has dragged the e-mail address 92 a small distance triggering display of the pop-up menu icons 74, 76, 84, 86, 94. In this example, the GUI system recognizes that the selected text is an e-mail address and accordingly displays pop-up icons that are suitable for an e-mail address, including copy 74, cut 76, add to a contacts database 84, look up in the contacts database 86, and send an e-mail 94.

Figure 16:
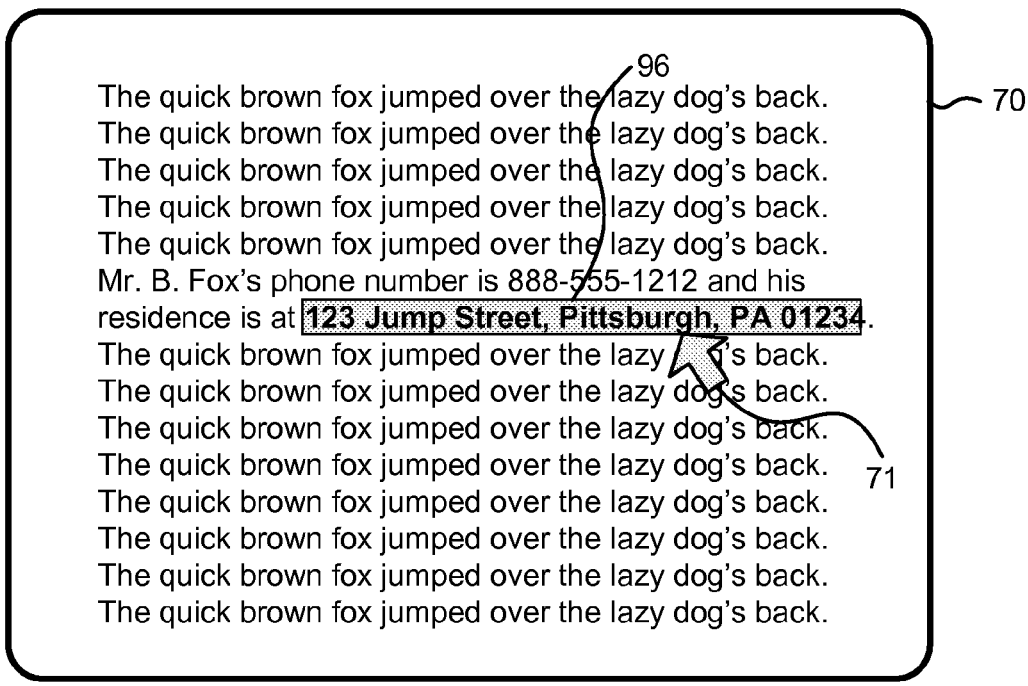
Figure 17:
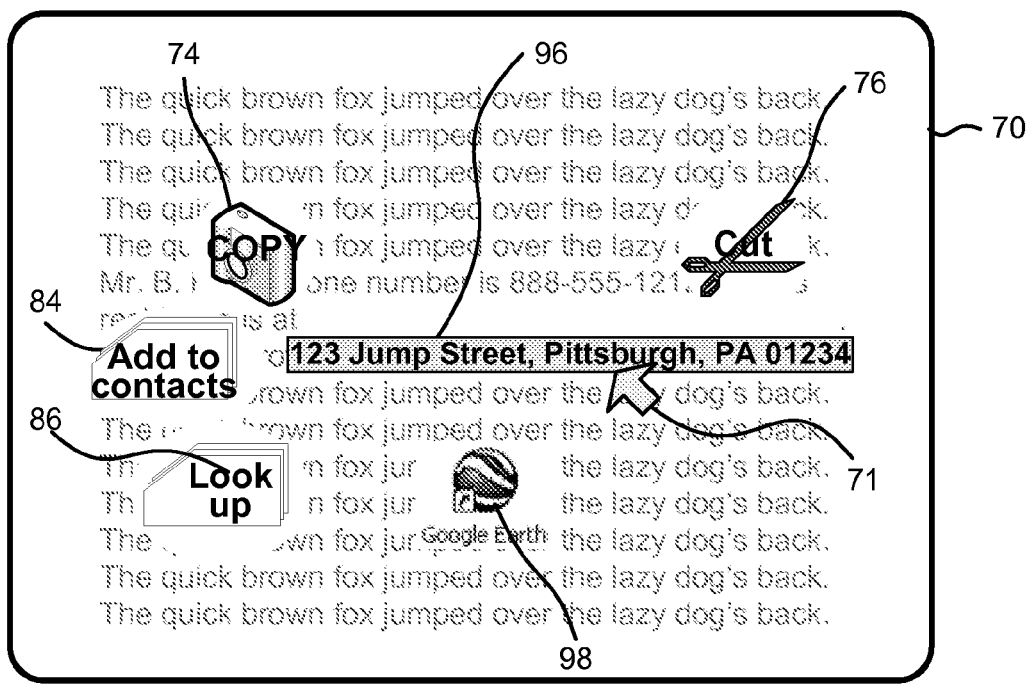

As a further example, FIG. 16 illustrates an example of the display 70 in which a user has selected postal address 96 but has not yet dragged the selection. FIG. 17 illustrates the display 70 after the user has dragged the postal address 96 a small distance triggering display of the pop-up menu icons 74, 76, 84, 86, 98. In this example, the GUI system recognizes that the selected text is a postal address and accordingly displays pop-up icons that are suitable for a postal address, including copy 74, cut 76, add to a contacts database 84, look up in the contacts database 86, and look up the address in a mapping program, such as Google Earth™ 98.

Figure 18:
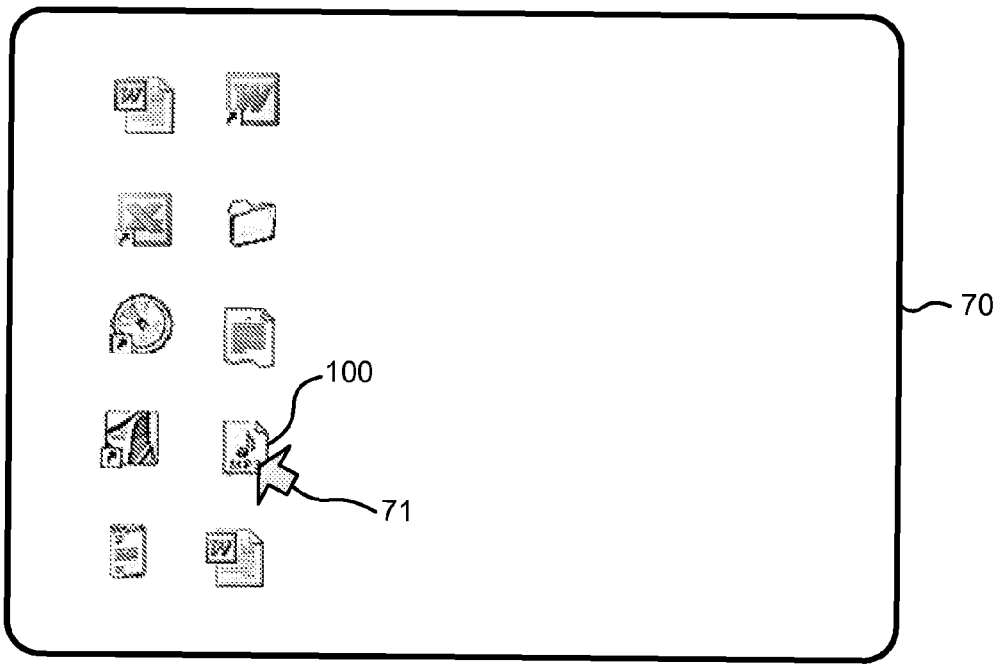

FIG. 18 illustrates an example of the display 70 when a file 100 is selected within a menu setting, such as a desktop. In this example, the file 100 is an MP3 file which has been selected, but not yet dragged.

Figure 19:
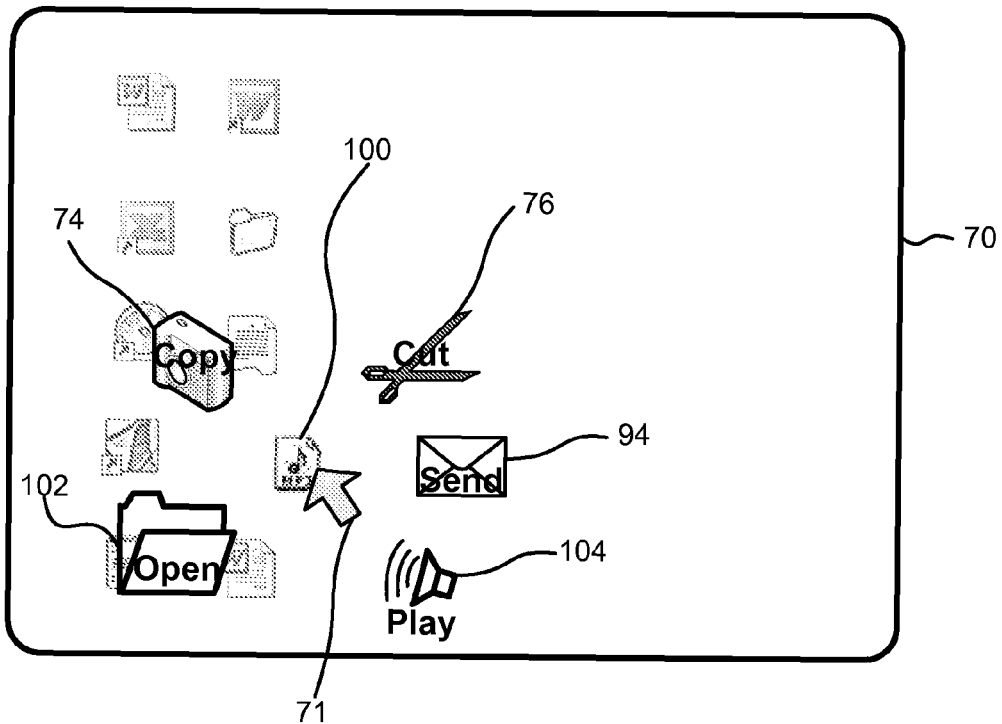

FIG. 19 illustrates how the display 70 will include pop-up menu icons 74, 76, 94, 102, 104 when the MP3 file 100 has been dragged a short distance. In this example, the GUI system has determined that the file 100 is an MP3, and accordingly has generated pop-up menu icons for actions or functions appropriate for a music file, namely copy 74, cut 76, send 94 (as in an e-mail attachment), open 102 and play 104. In a situation where the computer or mobile device includes multiple music players, separate player activation menu icons may be presented so that a user can select a particular player simply be dragging the selected file 100 to the desired player icon.

Figure 20:
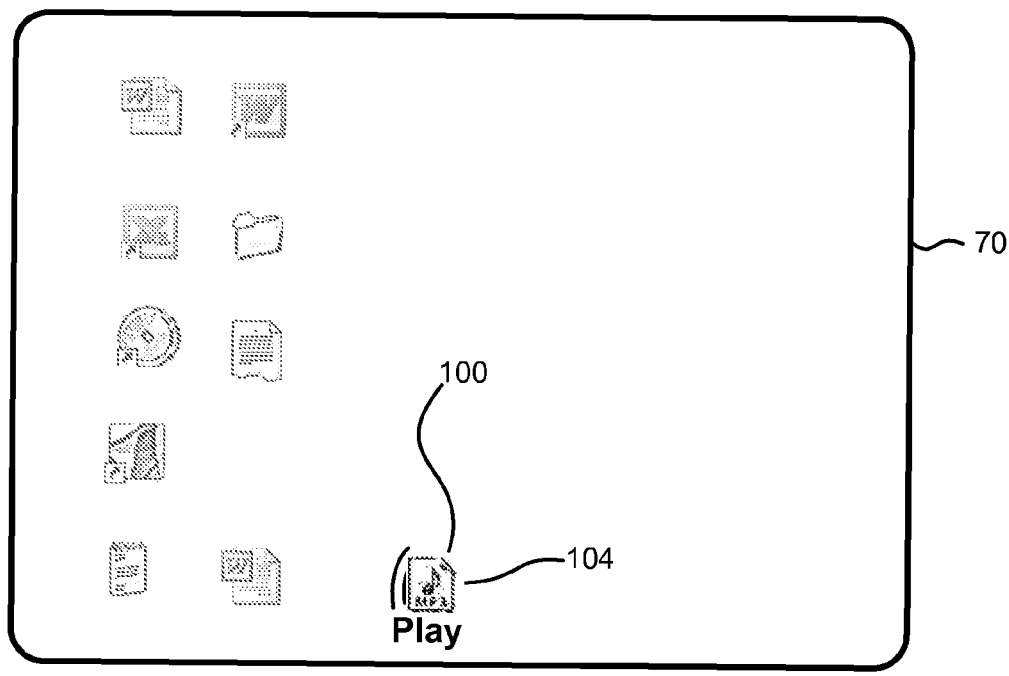

FIG. 20 illustrates how the display 70 will appear when the user drags the selected file 100 and "dropped" it on the player icon 104. This action causes the other pop-up menu icons to be removed while the media player application launches.

Figure 21:
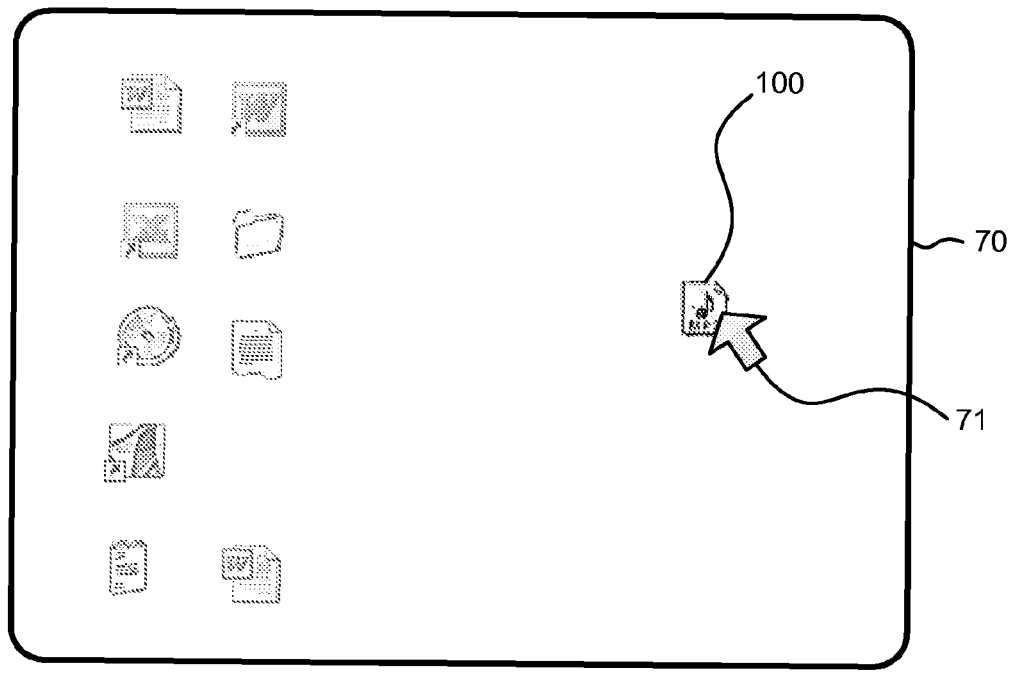

FIG. 21 illustrates how the display 70 will appear when the user drags the selected file 100 beyond the area of the pop-up menu icons. This action causes the pop-up menu icons to be removed and GUI functioning to proceed without the pop-up icons.

Figure 22:
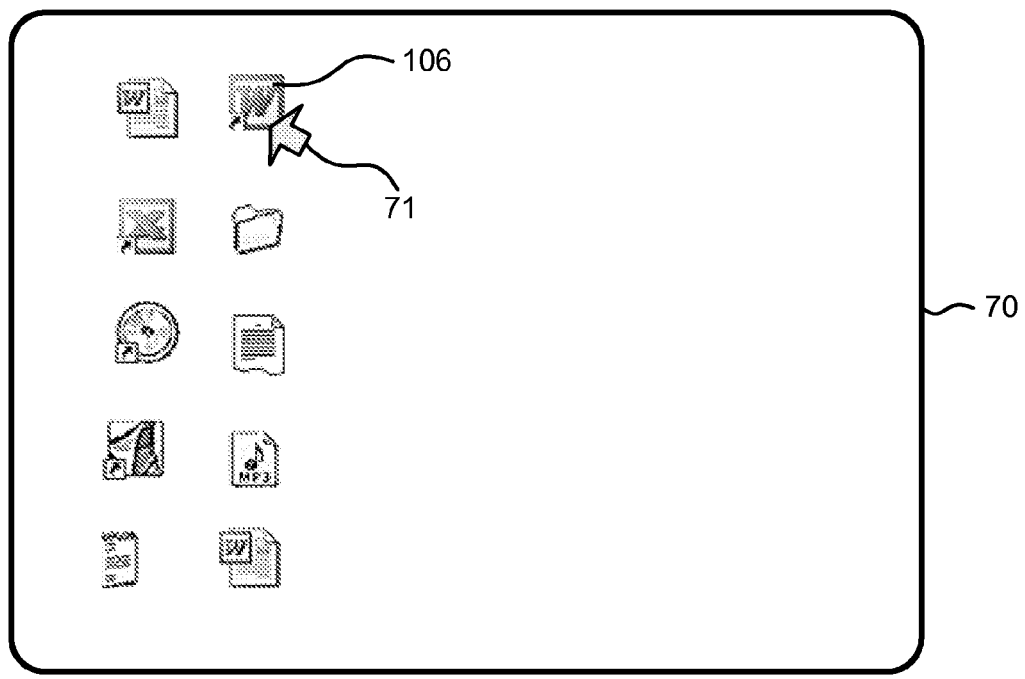
Figure 23:
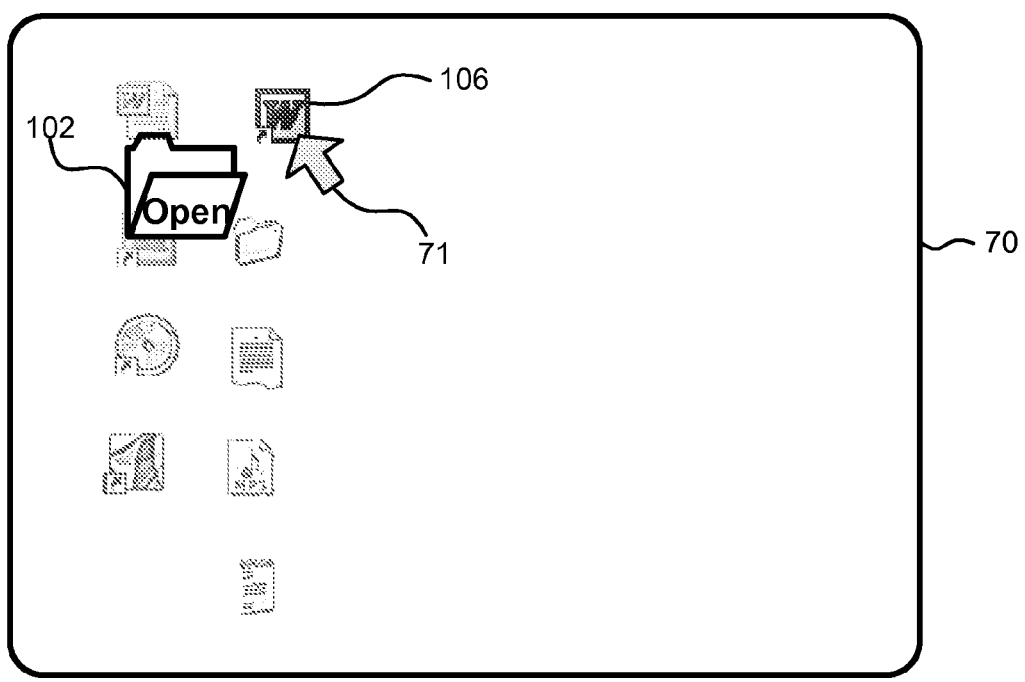

FIG. 22 illustrates an example of the display 70 when a word processing application 106 is selected on the desktop before it is dragged. FIG. 23 illustrates how the display 70 will include an open pop-up menu icon 102 when the word processing application 106 has been dragged a short distance. For purposes of example, FIG. 23 illustrates an implementation in which a word processing application only has a single available function, namely open. In some implementations, an application may have other available functions, such as cut (or delete).

Figure 24:
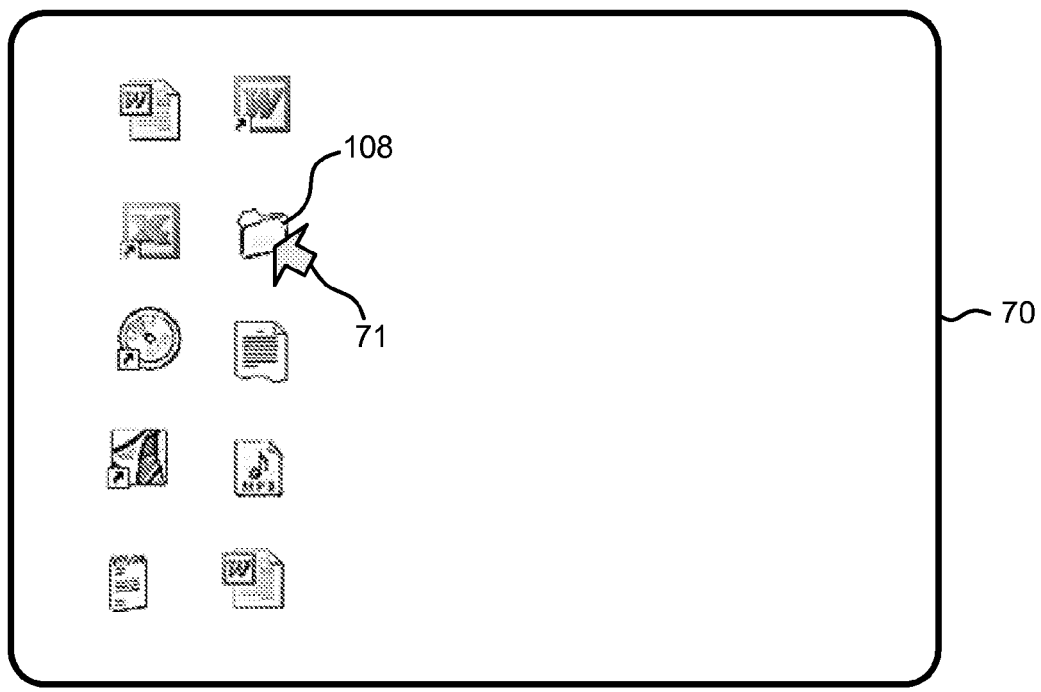
Figure 25:
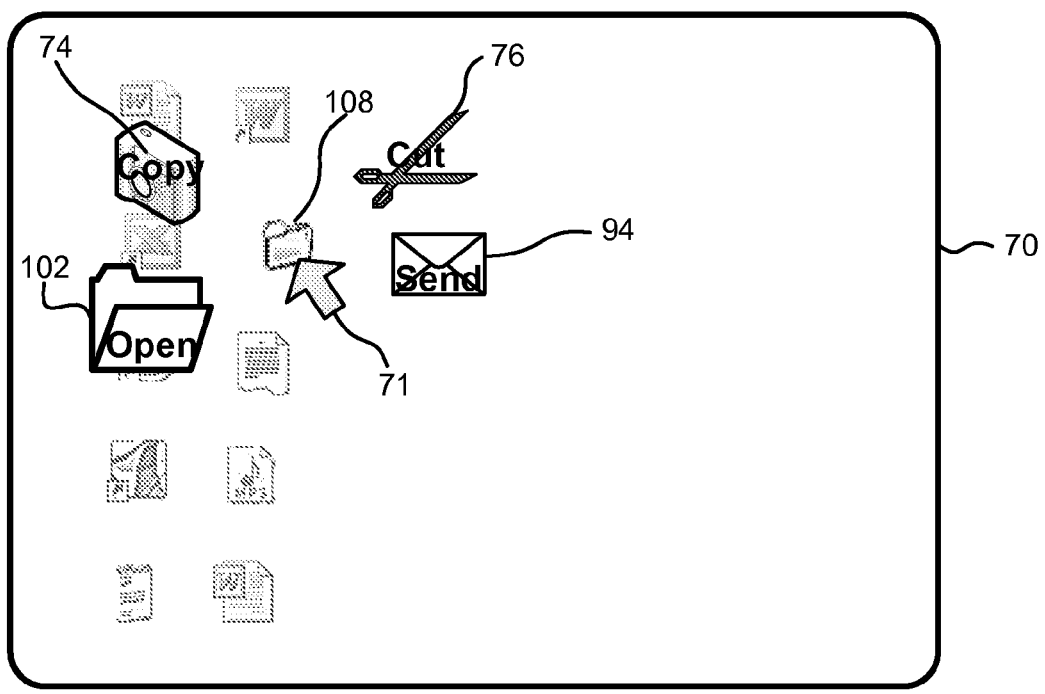
Figure 26:
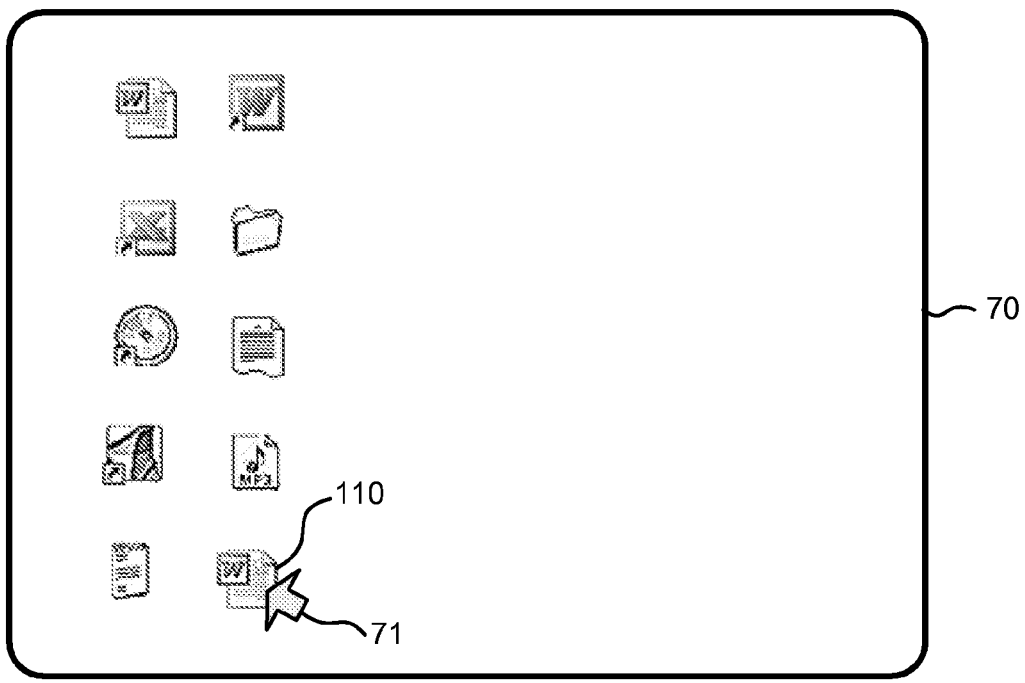

FIG. 24 illustrates an example of the display 70 when a file folder 108 is selected on the desktop before it is dragged. FIG. 26 illustrates how the display 70 will include pop-up menu icons 74, 76, 94, 102 when the file folder 108 has been dragged a short distance. In this example, available and appropriate actions or functions for a file folder include copy 74, cut (or delete) 76, send 94 (as in an e-mail attachment) and open 102.

Figure 27:
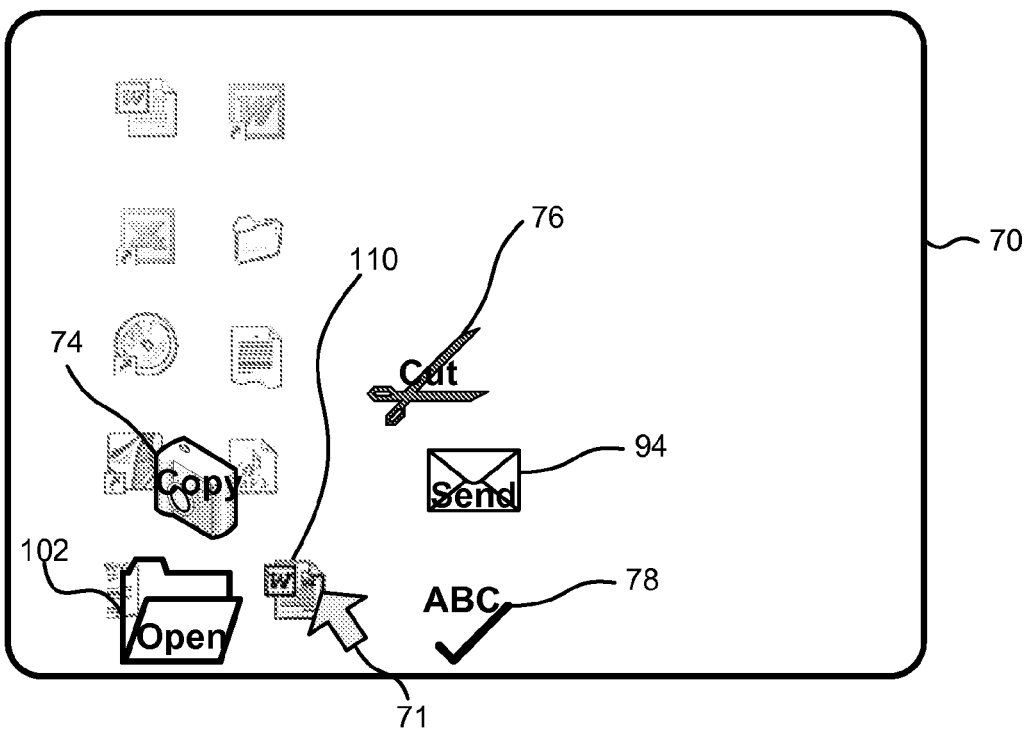

FIG. 26 illustrates an example of the display 70 when a word processing file 110 is selected on the desktop before it is dragged. FIG. 27 illustrates how the display 70 will include pop-up menu icons 74, 76, 78, 94, 102 when the word processing file 110 has been dragged a short distance. In this example, available and appropriate actions or functions for a word processing file 110 include copy 74, cut 76 (or delete), spell checking 78, send 94 (as in an e-mail attachment) and open 102.

Figure 28A:
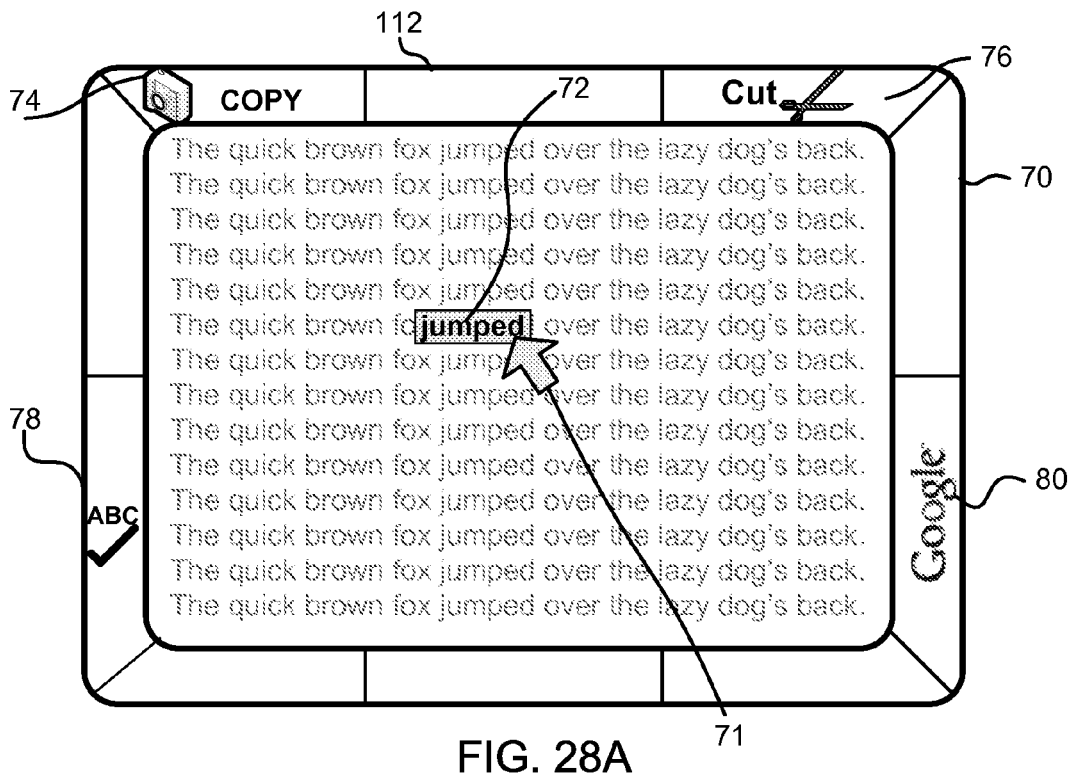
FIGS. 28A-28D are illustrations of an alternative aspect graphical user interface displays of a context-dependent pop-up menu activated in response to various select and drag operations.
Figure 28B:
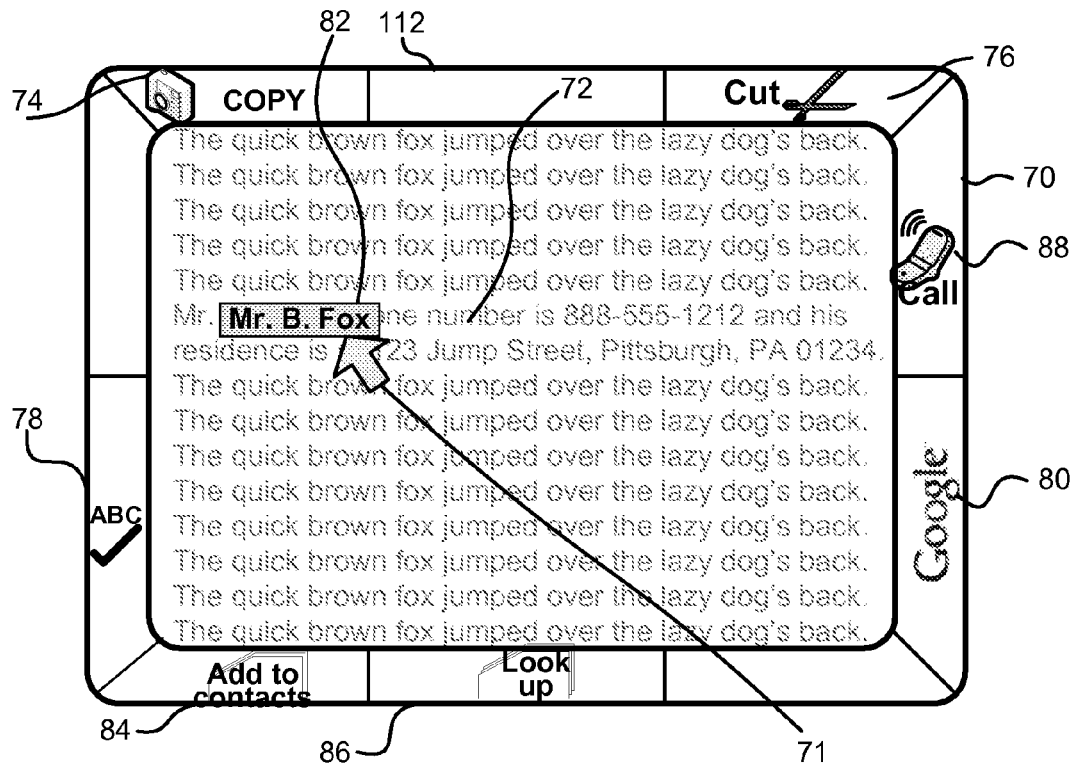

In alternative aspect, the pop-up menu icons may be configured to appear in a peripheral menu panel 112 surrounding the periphery of the display 70, an example of which is illustrated in FIGS. 28A and 28B. Referring to FIG. 28A, a peripheral menu panel 112 may be generated in response to an object, such as text 72, is selected and dragged. Menu icons 74, 76, 78, 80 available and appropriate for the selected object may be displayed in the peripheral menu panel 112. Such a peripheral menu panel 112 may appear over a portion of the display 70. In an aspect, the menu icons appear in the same portions of the panel so that icons available and appropriate for a selected object are displayed within their panel portions while unavailable icons result in blank portions. This is illustrated FIG. 28B in which the 'Add to contacts' menu icon 84 and "Look up" menu icon 86 are appropriate for a selected name 82. These pop-up menu icons 84, 86 appear in portions of the pop-up peripheral menu panel 112 that are blank in the selected text object example shown in FIG. 28A.

Figure 28C:
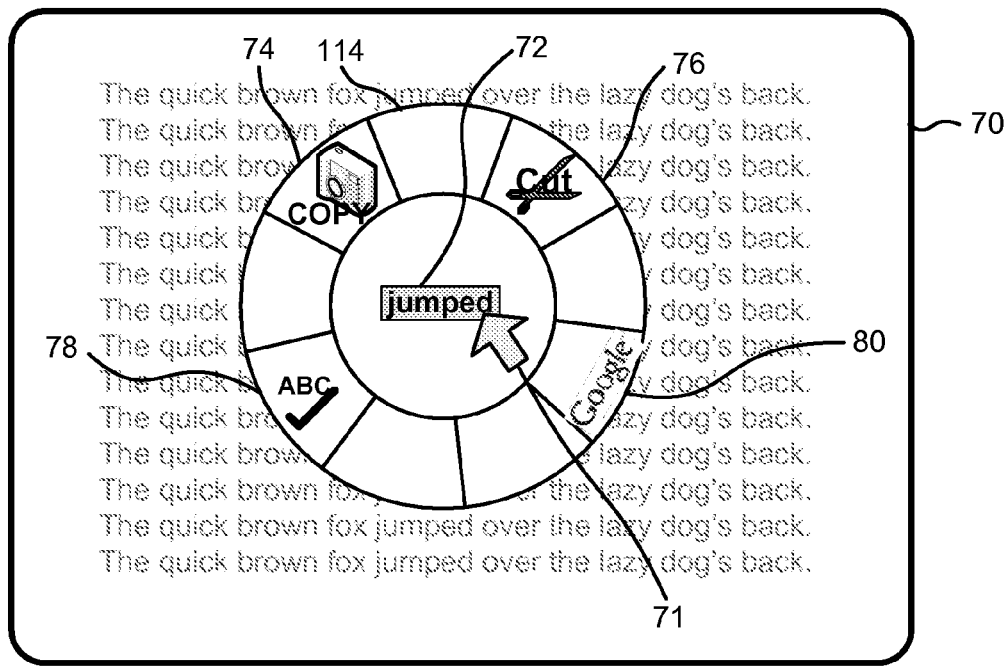
Figure 28D:
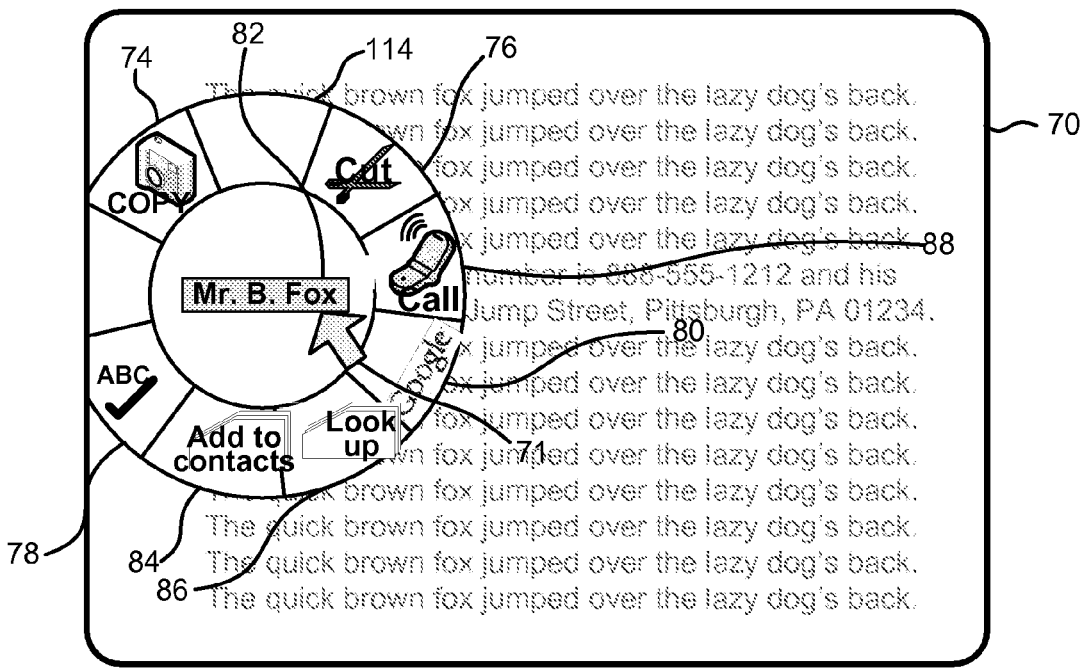

In alternative aspect, the pop-up menu icons may be configured to appear in an arc or circle surrounding a selected and dragged object or file, an example of which is illustrated in FIGS. 28C and 28D. Referring to FIG. 28C, a circular menu wheel 114 may be generated in response to an object, such as text 72, is selected and dragged. Menu icons 74, 76, 78, 80 available and appropriate for the selected object may be displayed in the circular menu wheel 114. Such a pop-up circular menu wheel 114 may appear over a portion of the display 70.

In an aspect, the menu icons appear in the same sector so that icons available and appropriate for a selected object are displayed within their sectors while unavailable icons result in blank sectors. This is illustrated FIG. 28D in which the 'Add to contacts' menu icon 84 and "Look up" menu icon 86 are appropriate for a selected name 82. These pop-up menu icons 84, 86 appear in sectors of the pop-up circular menu wheel 114 that are blank in the selected text object example shown in FIG. 28C.

As the foregoing examples illustrate, the various aspects provide a flexible menu icon system that presents icons only when needed and only as available for a particular selection.

In an aspect, a data table may be stored in memory and used by the GUI system to determine which (if any) pop-up menu icons should be displayed for each type of selection (i.e., folder, file, application, or object type). FIG. 29 illustrates a portion of an example data table 120 that may be used in conjunction with the various aspects. Such a data table 120 may include a plurality of records (rows) that each includes a number of data records (columns 121-129). In this example, a data record is provided for each type of file, item or object that may be selected and dragged (see column 121), along with flags that may be set to indicate whether particular menu icons should be displayed in the event of a select & drag operation on a particular object. By storing a series of flags in a data table in this manner a large number of different of menu icons supporting a large number of different objects and applications can be supported in a compact and flexible manner.

In an aspect, when the GUI system determines the type of the selected file or object (block 22 in FIG. 2), this determination can be used as a look up value to determine the appropriate record to access in the data table 120, and then use the flags in that record to determine which pop-up menu icons to display. When the menu icons are identified, the GUI system can access icon graphic files stored in a different memory location to generate the display 70. In alternative aspect, instead of including binary flags each data record 122-129 may include a memory pointer to a memory location containing the graphics for an icon if a menu icon is appropriate.

For example, consider the case of a text item selection (as is illustrated in FIGS. 4-8). The data table 120 includes a "1" or positive flag in data fields associated with copy 122 and cut 123 for the text data record, and "0" or negative flags in the other data fields. Similarly, the example data table 120 includes a "1" or positive flag in data fields associated with copy 122, cut 123, contact add 125, contact look up 126 for the name data record, and "0" or negative flags in the other data fields. Example flag settings for other types of objects and files are illustrated in FIG. 29.

The use of a data table 120 to keep track of menu icons also enables an aspect in which applications can register with the operating system to enable context-specific pop-up menu icons. Registration of a new application for context-specific pop-up menu icons can be accomplished by appending to the data table 120 records for the application, as well as any unique application document object types, which include data fields 122-129 with flags (or memory pointers) indicating which pop-up menu icons should be displayed when the application and any unique object types are selected and dragged. This is illustrated in FIG. 29 in the bottom two rows which show for Application X that the open and play menu icons should be displayed and for Application X unique data object type 1 the copy, cut, contact add and send function menu icons should be displayed. As indicated by the ellipsis 130 in the columns and rows, any number of additional application records can be added and any number of data fields (i.e., different menu icons) can be added.

The hardware used to implement the forgoing aspects may be processing elements and memory elements configured to execute a set of instructions, wherein the set of instructions are for performing method blocks corresponding to the above methods. Alternatively, some functions or methods may be performed by circuitry that is specific to a given function.

Figure 30:
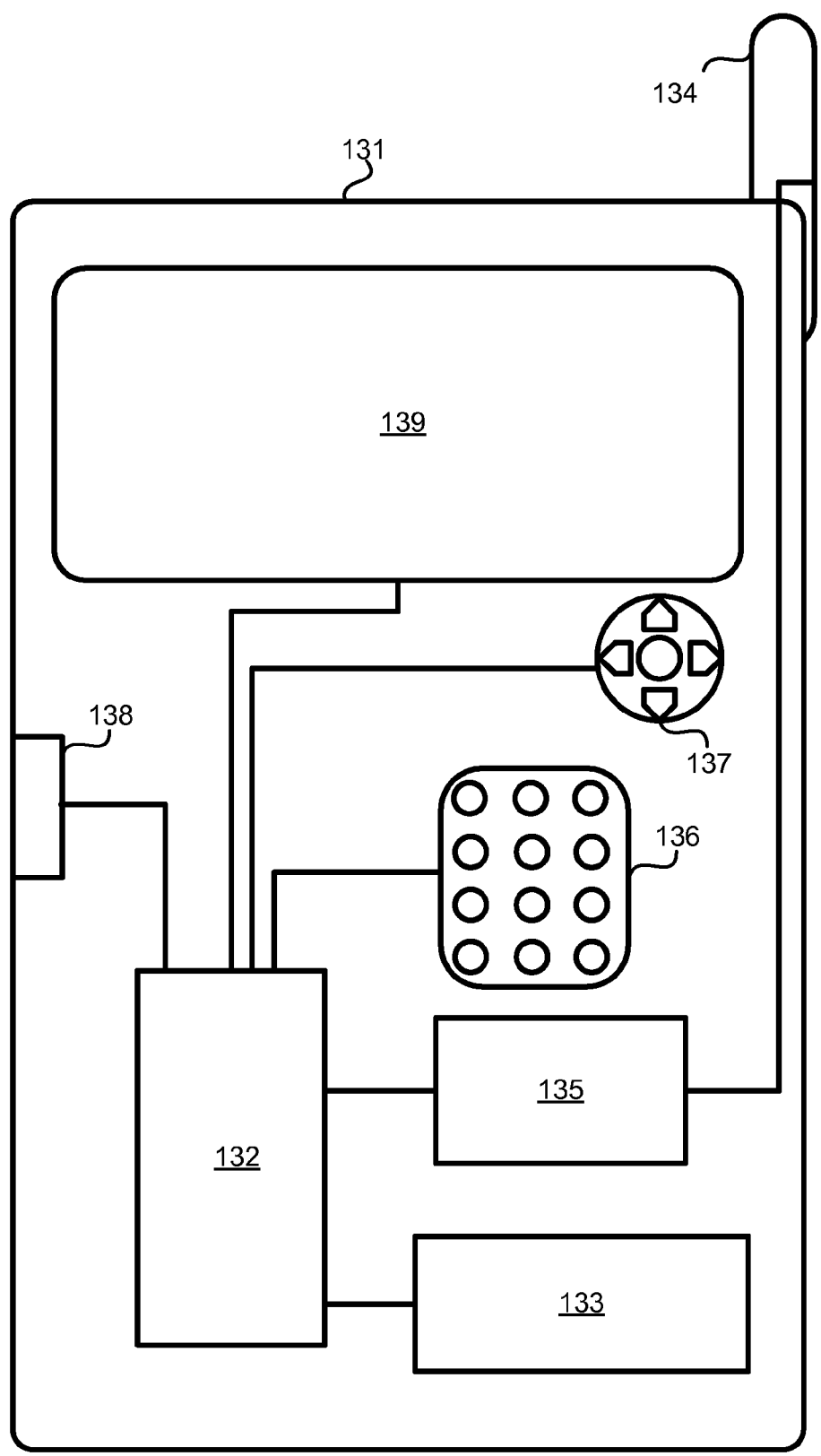
FIG. 30 is a component block diagram of a mobile device suitable for implementing the various aspects.

The aspects described above may be implemented on any of a variety of mobile devices. Typically, such mobile devices will have in common the components illustrated in FIG. 30. For example, the portable computing devices 131 may include a processor 132 coupled to internal memory 133 and a display 139. Additionally, the portable computing device 131 will have an antenna 134 for sending and receiving electromagnetic radiation that is connected to a wireless data link and/or cellular telephone transceiver 135 coupled to the processor 132. In some implementations, the transceiver 135 and portions of the processor 132 and memory 133 used for cellular telephone communications is referred to as the air interface since it provides a data interface via a wireless data link. Portable computing devices 139 also typically include a key pad 136 or miniature keyboard and menu selection buttons or rocker switches 137 which serve as pointing devices for receiving user inputs for positioning a cursor within the display 139. Portable computing devices 139 may also include a touchpad or touchscreen which may serve as a pointing device for receiving user inputs for positioning a cursor within the display 139. The processor 132 may further be connected to a wired network interface 138, such as a universal serial bus (USB) or FireWire® connector socket, for connecting the processor 132 to an external pointing device (e.g., a mouse) or computing device such as a personal computer 160 or external local area network.

The processor 132 may be any programmable microprocessor, microcomputer or multiple processor chip or chips that can be configured by software instructions (applications) to perform a variety of functions, including the functions of the various aspects described above. In some portable computing device 131, multiple processors 132 may be provided, such as one processor dedicated to wireless communication functions and one processor dedicated to running other applications. The processor may also be included as part of a communication chipset. Typically, software applications may be stored in the internal memory 133 before they are accessed and loaded into the processor 132. In some mobile devices 131, the processor 132 may include internal memory sufficient to store the application software instructions. For the purposes of this description, the term memory refers to all memory accessible by the processor 132, including internal memory 133 and memory within the processor 132 itself. Application data files are typically stored in the memory 133. In many mobile devices 131, the memory 133 may be a volatile or nonvolatile memory, such as flash memory, or a mixture of both.

Figure 31:
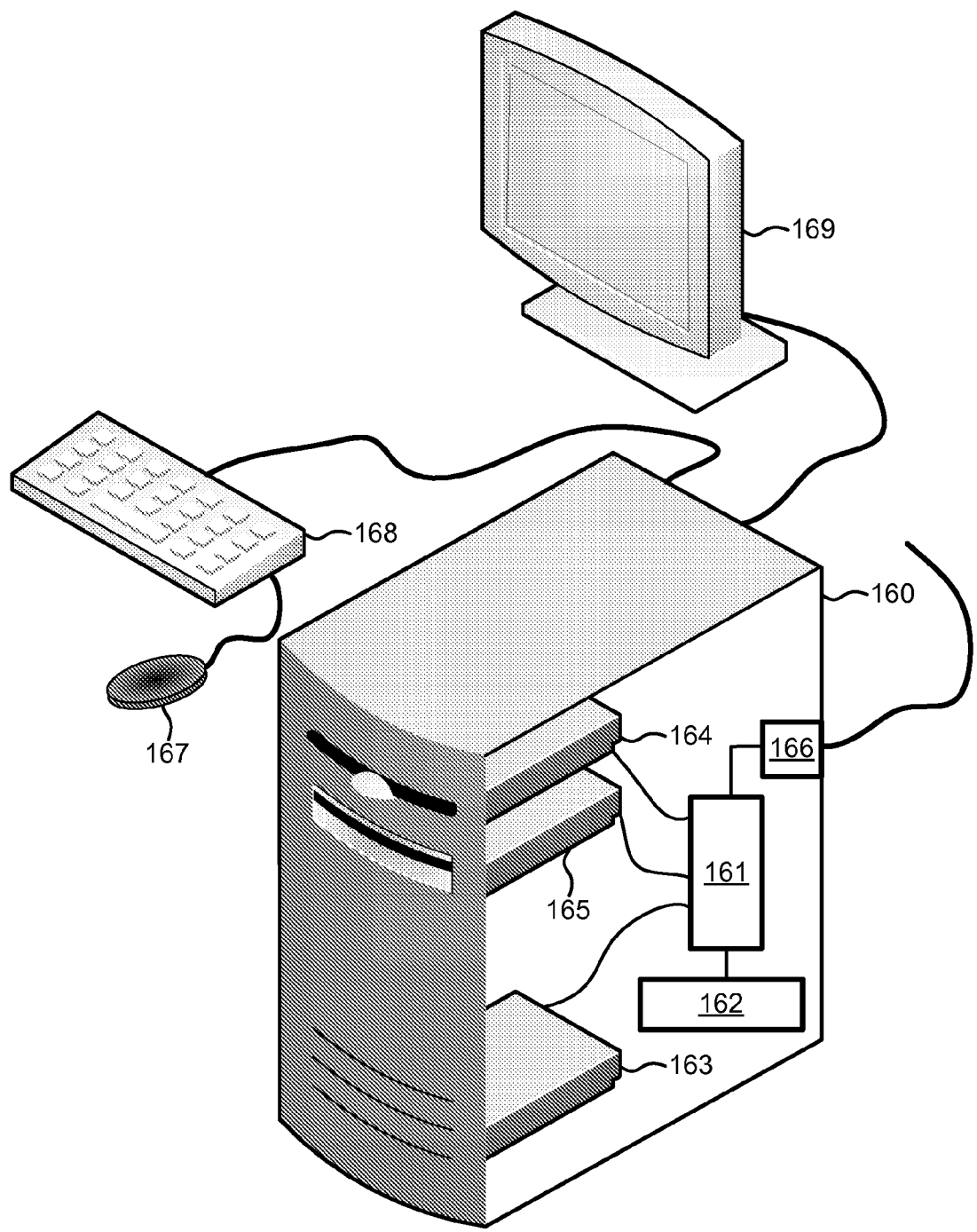
FIG. 31 is a component block diagram of a computer suitable for implementing the various aspects.

The aspects described above may also be implemented on any of a variety of computing devices, such as a personal computer 160 illustrated in FIG. 31. Such a personal computer 160 typically includes a processor 161 coupled to volatile memory 162 and a large capacity nonvolatile memory, such as a disk drive 163. The computer 13 may also include a floppy disc drive 164 and a compact disc (CD) drive 165 coupled to the processor 161. Typically the computer device 13 will also include a pointing device such as a mouse 167, a user input device such as a keyboard 168 and a display 166. The computer device 13 may also include a number of connector ports coupled to the processor 161 for establishing data connections or receiving external memory devices, such as a USB or FireWire® connector sockets or other network connection circuits 166 for coupling the processor 161 to a network. In a notebook configuration, the computer housing includes the pointing device 167, keyboard 168 and the display 169 as is well known in the computer arts.

The various aspects may be implemented by a computer processor 161 executing software instructions configured to implement one or more of the described methods. Such software instructions may be stored in memory 162, 163 as separate applications, or as compiled software implementing an aspect method. Reference database may be stored within internal memory 162, in hard disc memory 164, on tangible storage medium or on servers accessible via a network (not shown). Further, the software instructions and databases may be stored on any form of tangible processor-readable memory, including: a random access memory 162, hard disc memory 163, a floppy disk (readable in a floppy disc drive 164), a compact disc (readable in a CD drive 165), electrically erasable/programmable read only memory (EEPROM), read only memory (such as FLASH memory), and/or a memory module (not shown) plugged into the computer 160, such as an external memory chip or a USB-connectable external memory (e.g., a "flash drive") plugged into a USB network port 166.

Those of skill in the art would appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The order in which the blocks of a method described above and shown in the figures is for example purposes only as the order of some blocks may be changed from that described herein without departing from the spirit and scope of the present invention and the claims.

The blocks of a method or algorithm described in connection with the aspects disclosed herein may be embodied directly in hardware, in a software module executed by a processor, or in a combination of the two. A software module may reside in processor readable memory which may be any of RAM memory, flash memory, ROM memory, EPROM memory, EEPROM memory, registers, hard disk, a removable disk, a CD-ROM, or any other form of storage medium known in the art. An exemplary storage medium is coupled to a processor such that the processor can read information from, and write information to, the storage medium. In the alternative, the storage medium may be integral to the processor. The processor and the storage medium may reside in an ASIC. The ASIC may reside in a user terminal or mobile device. In the alternative, the processor and the storage medium may reside as discrete components in a user terminal or mobile device. Additionally, in some aspects, the blocks and/or actions of a method or algorithm may reside as one or any combination or set of codes and/or instructions on a machine readable medium and/or computer readable medium, which may be incorporated into a computer program product.

The foregoing description of the various aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein, and instead the claims should be accorded the widest scope consistent with the principles and novel features disclosed herein.

What is claimed is:

1. A method for providing menu icons in a graphical user interface (GUI), comprising:
    detecting a select and drag event of the object;
    determining a type of the selected object;
    identifying actions or functions that are appropriate for the type of the selected object;
    displaying only during the select and drag event one or more pop-up menu icons associated with the identified actions or functions appropriate for the selected object;
    positioning the pop-up menu icons in close proximity to the selected object within a GUI display;
    performing an action or function on the selected object in response to the selected object being released when positioned over one of the pop-up menu icons corresponding to the action or function; and
    terminating display of the one or more pop-up menu icons in response to the selected object being dragged beyond an area associated with the one or more pop-up menu icons.

2. The method of claim 1, wherein the object comprises at least one of an application, file, file folder, text selection within a document, image selection within a document, portion of a an audio file and portion of a video file.

3. The method of claim 1, further comprising registering an application with the GUI including identifying one or more pop-up menu icons which should be displayed when an icon associated with the application is selected and dragged within the GUI.

4. A computer, comprising:
    a processor;
    a display coupled to the processor; and
    a memory coupled to the processor, wherein the processor is configured to:
        detect a select and drag event of the object;
        determine a type of the selected object;
        identify actions or functions that are appropriate for the type of the selected object;
        present on the display only during the select and drag event one or more pop-up menu icons associated with the identified actions or functions appropriate for the selected object;
        position the pop-up menu icons in close proximity to the selected object within the GUI display;
        perform an action or function on the selected object in response to the selected object being released when positioned over one of the pop-up menu icons corresponding to the action or function; and
        terminate presentation on the display of the one or more pop-up menu icons in response to the selected object being dragged beyond an area associated with the one or more pop-up menu icons.

5. The computer of claim 4, wherein the processor is configured such that the object comprises at least one of an application, a file, file folder, text selection within a document, image selection within a document, portion of a an audio file and portion of a video file.

6. The computer of claim 4, wherein the processor is configured to register an application with the GUI including identifying one or more pop-up menu icons which should be displayed when an icon associated with the application is selected and dragged within the GUI.

7. A computer, comprising:
    means for detecting a select and drag event of an object within a graphical user interface (GUI);
    means for determining a type of the selected object;
    means for identifying actions or functions that are appropriate for the type of the selected object;
    means for displaying only during the select and drag event one or more pop-up menu icons associated with the identified actions or functions appropriate for the selected object;
    means for positioning the pop-up menu icons in close proximity to the selected object within a GUI display;
    means for performing an action or function on the selected object in response to the selected object being released when positioned over one of the pop-up menu icons corresponding to the action or function; and
    means for terminating display of the one or more pop-up menu icons in response to the selected object being dragged beyond an area associated with the one or more pop-up menu icons.

8. The computer of claim 7, wherein the object may comprise of at least one of an application, file, file folder, text selection within a document, image selection within a document, portion of an audio file and portion of a video file.

9. The computer of claim 7, further comprising means for registering an application with the GUI including identifying one or more pop-up menu icons which should be displayed when an icon associated with the application is selected and dragged within the GUI.

10. A non-transitory computer-readable medium having stored thereon processor-executable software instructions configured to cause a processor to perform operations comprising:
    detecting a select and drag event of the object;
    determining a type of the selected object;
    identifying actions or functions that are appropriate for the type of the selected object;
    displaying only during the select and drag event one or more pop-up menu icons associated with the identified actions or functions appropriate for the selected object;
    positioning the pop-up menu icons in close proximity to the selected object within a GUI display;
    performing an action or function on the selected object in response to the selected object being released when positioned over one of the pop-up menu icons corresponding to the action or function; and
    terminating display of the one or more pop-up menu icons in response to the selected object being dragged beyond an area associated with the one or more pop-up menu icons.

11. The non-transitory computer-readable medium of claim 10, wherein the object may comprise of at least one of an application, file, file folder, electronic document, text selection within a document, image selection within a document, portion of an audio file and portion of a video file.

12. The non-transitory computer-readable medium of claim 10, wherein the stored processor-executable software instructions are configured to cause a processor to perform operations comprising:
    registering an application with the GUI including identifying one or more pop-up menu icons which should be displayed when an icon associated with the application is selected and dragged within the GUI.

* * * * *